US008902472B2

(12) United States Patent
Inokuchi et al.

(10) Patent No.: US 8,902,472 B2
(45) Date of Patent: Dec. 2, 2014

(54) PRINTER

(71) Applicants:Citizen Holdings Co., Ltd., Tokyo (JP); Citizen Systems Japan Co., Ltd., Tokyo (JP)

(72) Inventors: Yutaka Inokuchi, Iida (JP); Takeshi Yamazaki, Iida (JP)

(73) Assignees: Citizen Holdings Co., Ltd., Tokyo (JP); Citizen Systems Japan Co., Ltd., Tokyo (JP)

( * ) Notice: Subject to any disclaimer, the term of this patent is extended or adjusted under 35 U.S.C. 154(b) by 0 days.

(21) Appl. No.: 14/201,987

(22) Filed: Mar. 10, 2014

(65) Prior Publication Data

US 2014/0293302 A1 Oct. 2, 2014

(30) Foreign Application Priority Data

Mar. 28, 2013 (JP) ................. 2013-070509

(51) Int. Cl.
*G06T 5/00* (2006.01)
*H04N 1/407* (2006.01)
*B41J 2/00* (2006.01)
*B41J 2/315* (2006.01)
*G06K 15/16* (2006.01)

(52) U.S. Cl.
CPC ...................... *G06K 15/16* (2013.01)
USPC ........ 358/3.26; 358/1.12; 358/1.18; 347/188; 347/190; 347/191; 347/193; 347/194; 347/195; 347/196; 400/120.07; 400/120.1; 400/120.11; 400/120.12; 400/120.13; 400/120.14; 400/120.15

(58) Field of Classification Search
CPC ........ B41J 2/36; B41J 2/362; G06K 15/1877; G06K 15/189; H04N 1/00092; H04N 1/4097
USPC ......... 347/188, 190, 191, 193, 194, 195, 196; 400/120.07, 120.1, 120.11, 120.12, 400/120.13, 120.14, 120.15
See application file for complete search history.

(56) References Cited

U.S. PATENT DOCUMENTS 4,695,173 A * 9/1987 Tomida .................... 400/120.08
6,222,573 B1 * 4/2001 Shibuki et al. ................ 347/188
(Continued)

FOREIGN PATENT DOCUMENTS

JP 2000015886 A 1/2000
JP 2011046155 A 3/2011
(Continued)

*Primary Examiner* — King Poon
*Assistant Examiner* — Vincent Peren
(74) *Attorney, Agent, or Firm* — Myers Wolin, LLC

(57) ABSTRACT

A printer includes a recording unit that executes on a recording medium, a recording operation under a sublimation transfer scheme; a conveying unit that using a protrusion roller having protrusions protruding toward an outer periphery and abutting a first surface of the recording medium, conveys the recording medium to a recording position for the recording operation; a pseudo recorded image data producing unit that produces pseudo recorded image data that includes pseudo pixels obtained by correcting a density of each predetermined pixel that is determined corresponding to an arrangement pattern of the protrusions on the protrusion roller and is determined from among pixels to be recorded in a second area that excludes a first area that is in contact with the protrusions, on the first surface of the conveyed recording medium; and a recording control unit that controls the recording unit based on the pseudo recorded image data.

11 Claims, 10 Drawing Sheets

(56) References Cited

U.S. PATENT DOCUMENTS

| | | | |
|---|---|---|---|
| 6,313,857 B1* | 11/2001 | Shimizu | 347/188 |
| 6,533,477 B2* | 3/2003 | Fukuda | 400/120.01 |
| 6,833,852 B1* | 12/2004 | Maess et al. | 347/188 |
| 7,724,397 B2* | 5/2010 | Lee et al. | 358/3.26 |
| 8,570,354 B2* | 10/2013 | Matsuda et al. | 347/193 |
| 2002/0080222 A1* | 6/2002 | Kojima | 347/188 |
| 2002/0186416 A1* | 12/2002 | Trelewicz et al. | 358/3.06 |
| 2005/0168562 A1* | 8/2005 | Imai | 347/188 |
| 2006/0152573 A1* | 7/2006 | Busch et al. | 347/188 |
| 2009/0009579 A1* | 1/2009 | Yamazaki | 347/194 |
| 2010/0118101 A1* | 5/2010 | Yamakuni et al. | 347/188 |
| 2013/0242027 A1* | 9/2013 | Harris et al. | 347/197 |

FOREIGN PATENT DOCUMENTS

| | | |
|---|---|---|
| JP | 2011046156 A | 3/2011 |
| JP | 2011046157 A | 3/2011 |
| JP | 2008207447 A | 9/2011 |

\* cited by examiner

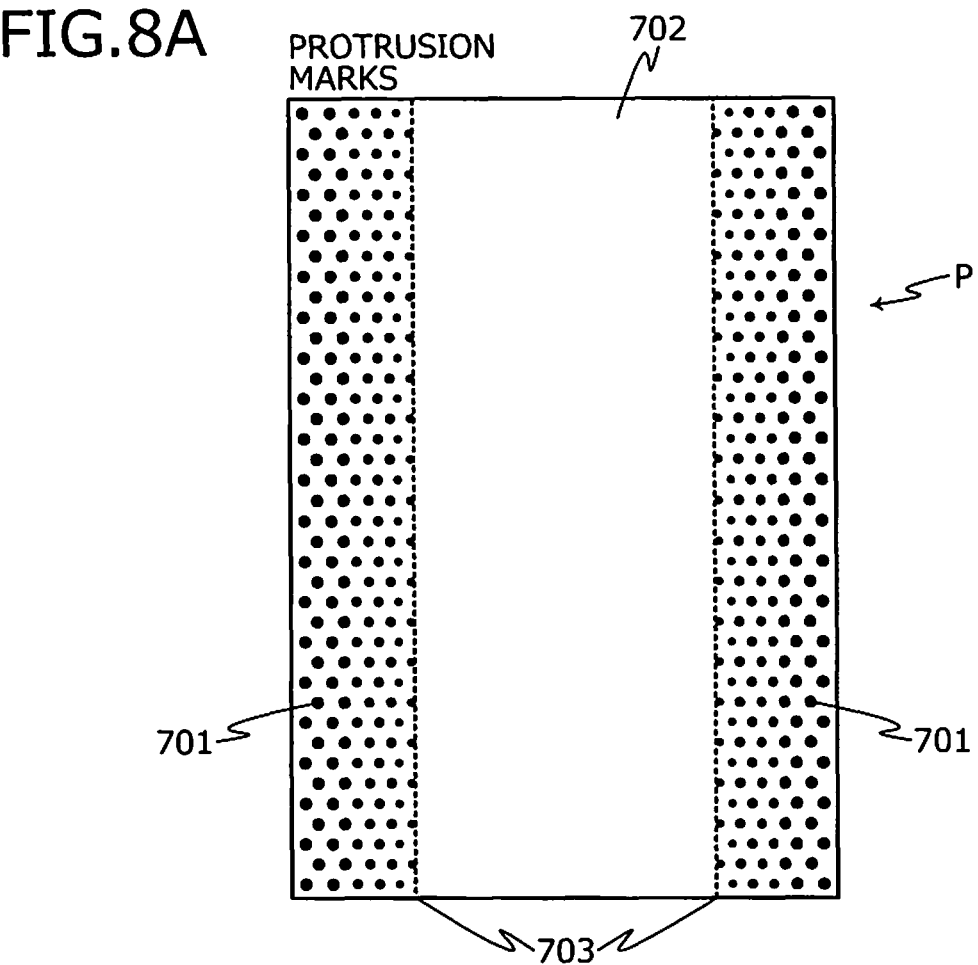

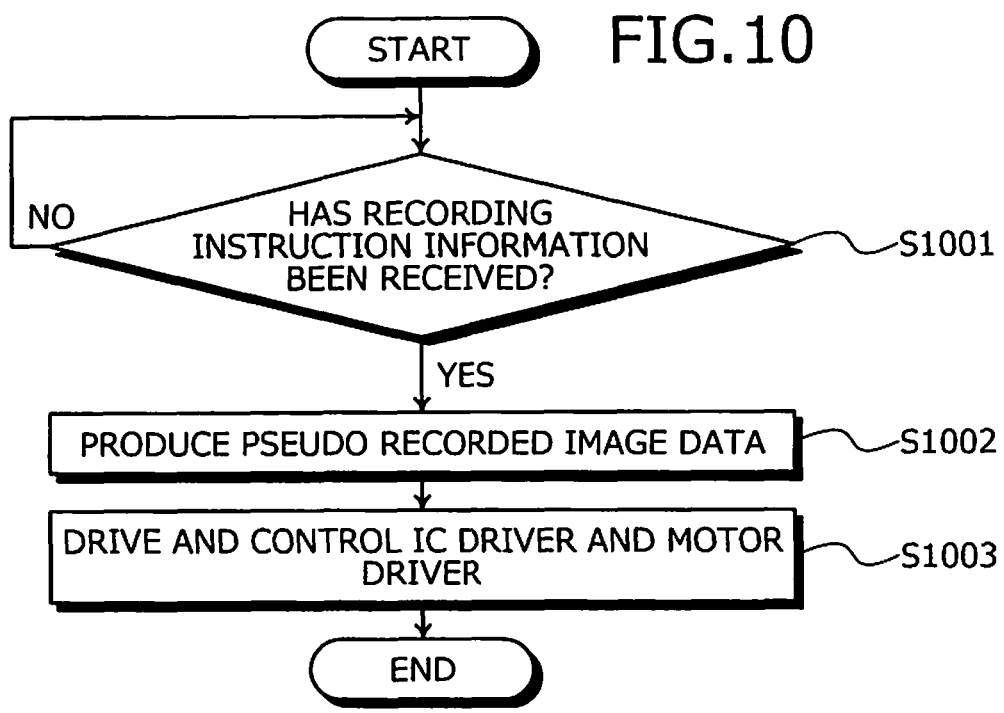

PRINTER

CROSS-REFERENCE TO RELATED APPLICATIONS

The present application claims priority to Japanese Application No. 2013-070509 filed on Mar. 28, 2013, the contents of which are incorporated by reference herein.

BACKGROUND OF THE INVENTION

1. Field of the Invention

The present invention relates to a printer capable of recording on both surfaces of a recording medium.

2. Description of the Related Art

One conventional printer receives a recording instruction for an image from an external apparatus, deconstructs into colors of cyan (C), magenta (M), and yellow (Y), pixels forming the image, and executes a recording operation of superimposing the colors as images onto each other. According to a technique for such printer, displacement of the recording positions of the image forming colors is prevented by holding the recording medium using a pair of rollers that include a grip roller that has protrusions thereon that protrude toward an outer periphery and a pinch roller that faces the grip roller, sandwiching the recording medium therebetween such that displacement of the recording positions of the colors forming images is prevented (see, e.g., Japanese Laid-Open Patent Publication No. 2000-15886).

In a case where a recording operation for both surfaces is executed using the printer, when the recording medium is held using the grip roller and the pinch roller sandwiched therebetween, marks of the protrusions of the grip roller are left on a recording surface on the front or the back surface of the recording medium on which duplex printing is executed. For a printer that executes a recording operation under a so-called sublimation transfer scheme in which a sublimation dye (sublimation pigment) included in an ink layer of an ink ribbon is transferred onto a recording layer of a recording medium to be recorded on, when the protrusion marks are left, the sublimation dye (sublimation pigment) can not be transferred well and therefore, the recording quality is degraded.

According to a conventional technique that is a countermeasure against the above and for a printer that thermally transfers an overcoat layer onto a recording surface having an ink thermally transferred thereon, the pressing force between a grip roller and a pinch roller is adjusted such that the grip roller is strongly pressed onto the recording surface before the transfer of the overcoat layer and is not strongly pressed onto the recording surface after the transfer (see, e.g., Japanese Laid-Open Patent Publication No. 2011-46157).

According to another conventional technique for a printer that thermally transfers an overcoat layer onto a recording surface having an ink thermally transferred thereon, when the overcoat layer is thermally transferred, the recording medium is conveyed by a feed roller having a smooth surface and thereby, contact of the protrusions of the grip roller with the recording surface having the overcoat layer thermally transferred thereon is prevented (see, e.g., Japanese Laid-Open Patent Publication No. 2011-46156).

According to a conventional technique for a printer that includes a printing head that executes a recording operation for a first surface of a recording medium and another printing head executing a recording operation for the back surface thereof, any contact of the grip roller with the recording surface is prevented by causing the distance in a path line between the printing head disposed on the same side as that of the grip roller against the recording medium, and the grip roller to be longer than a printing length of the recording medium (see, e.g., Japanese Laid-Open Patent Publication No. 2011-46155).

According to another conventional technique, a range is pressed and heated that corresponds to the protrusions of the grip roller in at least a printed area of a recording medium; a receptive layer disposed on the recording medium within the range is softened and pressed; and thereby, the protrusion marks are smoothed (see, e.g., Japanese Laid-Open Patent Publication No. 2008-207447).

However, according to the conventional techniques described in Japanese Laid-Open Patent Publication Nos. 2011-46157 and 2011-46156, although the protrusion marks tend to be inconspicuous, the protrusion marks remain in a recording area that abuts the protrusions of the grip roller and therefore, a problem arises in that a difference is generated in the recording quality depending on the recording position on the recording surface.

According to the conventional technique described in Japanese Laid-Open Patent Publication No. 2011-46155, the path length to convey the recording medium is increased and therefore, a problem arises in that the size of the printer is increased. According to the conventional technique described in Japanese Laid-Open Patent Publication No. 2008-207447, the mechanism to press and heat the recording medium is disposed and therefore, a problem arises in that the structure of the printer is complicated and the size thereof is increased.

SUMMARY OF THE INVENTION

A printer according to one aspect of the embodiment includes a recording unit that executes on a recording medium, a recording operation under a sublimation transfer scheme; a conveying unit that using a protrusion roller having thereon protrusions protruding toward an outer periphery and abutting a first surface of the recording medium, conveys the recording medium on which the recording unit executes the recording operation, to a recording position for the recording operation executed by the recording unit; a pseudo recorded image data producing unit that produces pseudo recorded image data that includes pseudo pixels obtained by correcting a density of each predetermined pixel that is determined corresponding to an arrangement pattern of the protrusions on the protrusion roller and is determined from among pixels to be recorded in a second area that excludes a first area that is in contact with the protrusions, on the first surface of the recording medium conveyed by the conveying unit; and a recording control unit that controls the recording unit based on the pseudo recorded image data.

BRIEF DESCRIPTION OF THE DRAWINGS

FIG. 8A is a diagram for explaining an example of an image of protrusion marks;

FIG. 10 is a flowchart of a processing procedure of the printer of the embodiment.

DETAILED DESCRIPTION OF THE PREFERRED EMBODIMENTS

Preferred embodiments of a printer will be described in detail with reference to the accompanying drawings.

Figure 1:
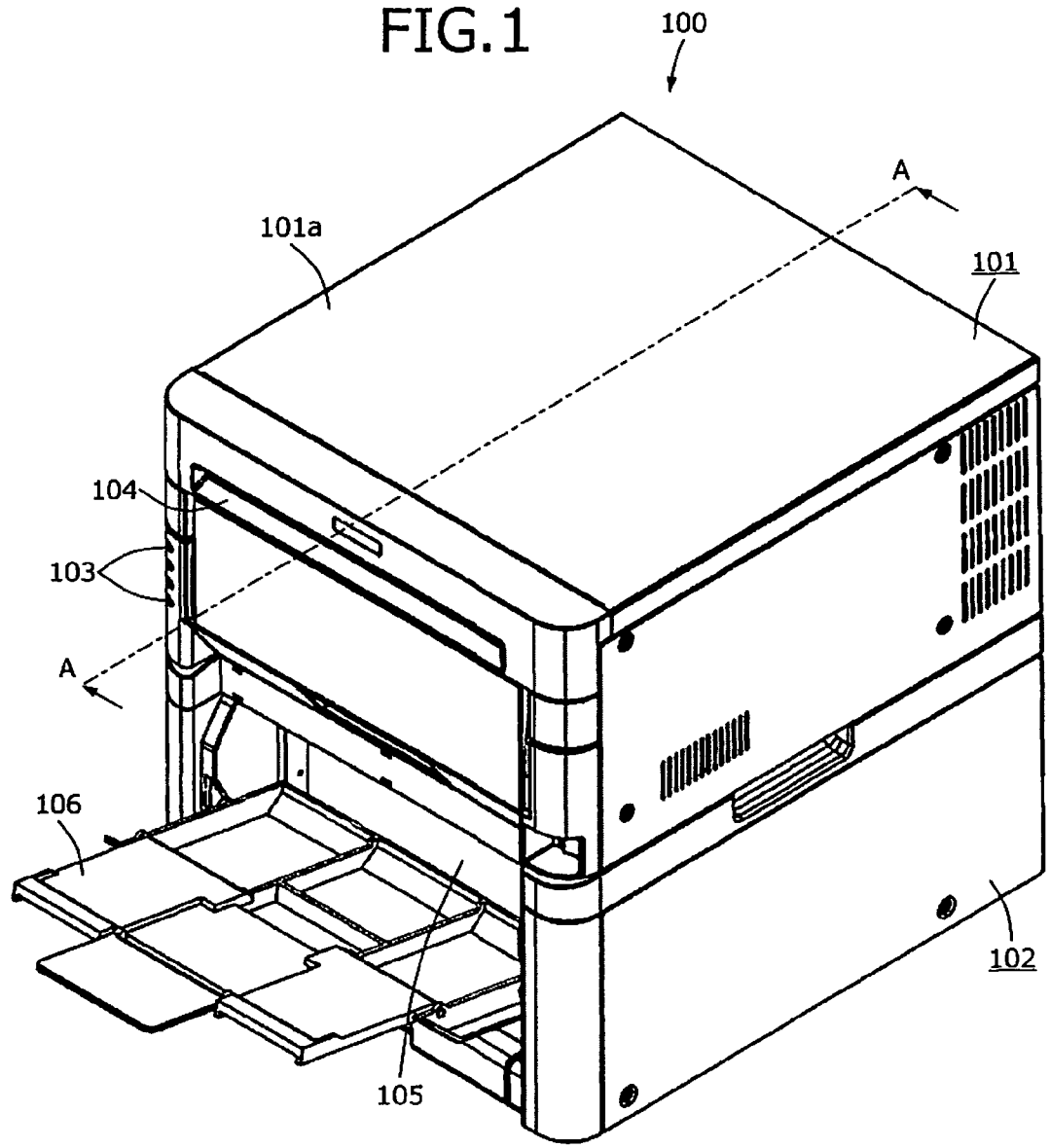
FIG. 1 is a diagram for explaining the appearance of a printer of an embodiment.

An appearance of the printer of an embodiment will first be described. FIG. 1 is a diagram for explaining the appearance of the printer of the embodiment. In FIG. 1, the printer 100 of the embodiment has a substantially box-like shape, and includes a printer unit (recording unit) 101 and a paper-feeding/paper-reversing unit (reversing unit) 102.

The printer 100 is used being placed on, for example, an upper surface of a base. When the printer 100 is placed, the printer unit 101 is disposed on the paper-feeding/paper-reversing unit 102 such that the paper-feeding/paper-reversing unit 102 is disposed beneath the printer unit 101. The printer unit 101 and the paper-feeding/paper-reversing unit 102 are adapted to be separable from each other.

Shapes, not depicted, to position the printer unit 101 and the paper-feeding/paper-reversing unit 102 are disposed in the coupling portions of the printer unit 101 and the paper-feeding/paper-reversing unit 102. Thereby, even when the printer unit 101 and the paper-feeding/paper-reversing unit 102 are adapted to be separable from each other, positioning can precisely and easily be established between the printer unit 101 and the paper-feeding/paper-reversing unit 102. A housing 101a of the printer 100 (the printer unit 101) is equipped with various types of state indicator lamps 103 that indicate the state of the printer 100.

The printer unit 101 executes a recording operation of recording onto a recording medium (printing sheet). The paper-feeding/paper-reversing unit 102 turns the recording medium over to switch, with respect to a recording position in the printer unit 101, the surface of the recording medium to be exposed for recording, and subsequently feeds the recording medium into the printer unit 101. The printer unit 101 executes the recording operation on the feed recording medium and thereby, can execute duplex printing with respect to the recording medium.

The printer 100 of the embodiment executes the recording operation under a so-called sublimation transfer scheme according to which thermal diffusion pigment (sublimation pigment) included in an ink layer of an ink ribbon is transferred onto a recording layer of a recording medium on which recording is performed. A printer that executes a recording operation under the sublimation transfer scheme is referred to as, for example, "dye-sublimation printer".

The printer 100, which is a dye-sublimation printer, uses a recording medium that has a recording layer (see FIGS. 8A to 8B and 9) on which recording is performed. The recording layer of the recording medium is disposed on the surface of a base material formed using paper, etc. The recording layer includes a heat insulating layer applied or attached to the base material, and a receptive layer laminated onto the heat insulating layer. The receptive layer accepts the transfer of the thermal diffusion pigment (sublimation pigment) included in the ink layer of the ink ribbon.

When the printer 100 of the embodiment executes a recording operation with respect to a first surface of the recording medium (single-sided printing), the printer 100 uses a recording medium suitable for the single-sided printing and, when the printer 100 executes a recording operation with respect to two surfaces of the recording medium (duplex printing), the printer 100 uses a recording medium suitable for the duplex printing. For example, a recording medium suitable for single-sided printing includes a recording layer disposed only on the first surface of the base material of the recording medium. For example, a recording medium suitable for duplex printing includes a recording layer disposed on both surfaces of the base material of the recording medium.

With the dye-sublimation printer, the ink concentration to be transferred onto the recording medium can be adjusted for each dot to be recorded. Therefore, the dye-sublimation printer is excellent in gradation expression. Because the dye-sublimation printer can provide excellent gradation expression, the dye-sublimation printer can provide image quality that is sufficient for printing photographs. Therefore, the dye-sublimation printer has been recently adopted for desktop publishing (DTP) uses.

The ink ribbon used for the recording operation in the sublimation transfer scheme includes a long strip of base material and an ink layer disposed on a surface of the base material. The ink layer is formed by a sublimation dye ink (an ink including a sublimation dye (sublimation pigment), that is, a sublimation ink). The ink ribbon will be described later.

The printer 100 includes a single-side printed material ejection exit 104 disposed on the printer unit 101, and a duplex printed material ejection exit 105 disposed on the paper-feeding/paper-reversing unit 102; and ejects the recorded medium on which recording has been performed by the printer unit 101, out from the housing 101a through the single-side printed material ejection exit 104 or the duplex printed material ejection exit 105.

In the embodiment, a first recording medium ejection position can be realized by the position at which the recorded medium is ejected through the single-side printed material ejection exit 104. In the embodiment, a second recording medium ejection position can be realized by the position at which the recorded medium is ejected through the duplex printed material ejection exit 105. The recorded medium on which the single-sided printing has been executed is ejected out of the housing 101a through the single-side printed material ejection exit 104, and is placed on a paper ejection tray not depicted that is prepared close to the single-side printed material ejection exit 104. The recorded medium on which the duplex printing has been executed is ejected out of the housing 101a through the duplex printed material ejection exit 105, and is placed (stacked) on a paper ejection tray 106.

An internal configuration of the printer 100 of the embodiment will be described. FIGS. 2, 3, 4, and 5 are each a cross-sectional diagram taken at A-A of FIG. 1. In FIGS. 2 to 5, the printer unit 101 includes a control circuit board not depicted. The control circuit board includes a micro computer that drives and controls components of the printer 100.

The printer unit 101 includes a first recording medium holding unit (recording medium holding unit) 201. The first recording medium holding unit 201 holds a recording medium P that is suitable for single-sided printing and that has a recording layer disposed on a single surface of the base material. The recording medium P held by the first recording medium holding unit 201 has a long strip-shape and is wound in a roll across its length. The first recording medium holding unit 201 holds the wound long strip recording medium P, enabling the recording medium P to be pulled out from the outer periphery thereof. The recording medium P held by the first recording medium holding unit 201 will be arbitrarily referred to as "rolled paper", and will be described below with a reference numeral "P1".

For example, the first recording medium holding unit 201 holds a winding-up shaft to be the center to wind up the rolled paper P1, enabling the winding-up shaft to be rotated. Thereby, the first recording medium holding unit 201 can hold the winding-up shaft enabling an end on the outer periphery of the rolled paper P1 to be pulled out from the first recording medium holding unit 201.

The printer unit 101 includes a first recording medium conveyance path 202. The first recording medium conveyance path 202 is formed between the single-side printed material ejection exit 104 that leads to the first recording medium ejection position and the first recording medium holding unit 201, and spans from the first recording medium holding unit 201 to the single-side printed material ejection exit 104.

A first paper sheet sensor 203 is disposed in a vicinity of a border position between the first recording medium holding unit 201 and the first recording medium conveyance path 202. An output value of the first paper sheet sensor 203 varies corresponding to presence or absence of the recording medium P (the rolled paper P1) pulled out from the first recording medium holding unit 201 to the first recording medium conveyance path 202. For example, the first paper sheet sensor 203 can be realized by, for example, a micro switch or a photosensor.

The printer unit 101 includes a recording unit (recording unit) 204. The recording unit 204 includes a thermal head 205 and a platen 206. The thermal head 205 and the platen 206 are disposed facing each other with the first recording medium conveyance path 202 therebetween. The thermal head 205 is disposed to be movable to a position for the thermal head 205 to be in contact with the platen 206 and a position to be away from the platen 206.

The thermal head 205 includes plural heating elements (heating resistors) arranged in a line along the width direction of the recording medium P (a direction perpendicular to the page in FIG. 2); a driver IC that drives the heating elements (see FIG. 6); etc. The driver IC selectively supplies electric power to electrode wires connected to the heating elements in the thermal head 205 and thereby, causes heating of the elements that correspond to the electrode wires supplied with the electric power. The thermal head 205 transfers to the ink ribbon 207, the heat generated by the heating elements, causes the sublimation dye ink disposed on the ink ribbon 207 to sublimate and to be transferred onto the recording medium, and thereby, executes the recording operation with respect to the recording medium.

The platen 206 has a cylindrical shape whose central axis direction is the width direction of the recording medium; is disposed enabling rotation about the central axis; and is subject to a force applied to the recording medium by the thermal head 205 facing the platen 206 with the recording medium therebetween, passively rotating in synchronization with the motion of the recording medium in contact therewith.

The recording unit 204 includes a ribbon unit 208. The ribbon unit 208 includes a pair of rollers 209 and 210 that hold the ink ribbon 207. The pair of rollers 209 and 210 includes a winding up roller 209 and a feeding roller 210. The winding up roller 209 is disposed to enable rotation, and winds up the ink ribbon 207 held by the feeding roller 210 from an end of the ribbon by rotating clockwise in FIG. 2. The feeding roller 210 holds the wound long strip ink ribbon 207, enabling the ink ribbon 207 to be unreeled from the outer periphery. The feeding roller 210 rotates clockwise in FIG. 2 associated with the winding up of the ink ribbon 207 caused by the rotation of the winding up roller 209, and unreels the ink ribbon 207 from the outer periphery.

The pair of rollers 209 and 210 hold the ink ribbon 207 such that the ink ribbon 207 is stretched between the thermal head 205 and the platen 206; and hold the ink ribbon 207 for the ink layer in the ink ribbon 207 to face the platen 206 between the thermal head 205 and the platen 206.

In the printer unit 101, a flap 211 is disposed at a connection position between the first recording medium holding unit 201 and the first recording medium conveyance path 202. The flap 211 guides the rolled paper P1 from the first recording medium holding unit 201 to the first recording medium conveyance path 202 for the single-sided printing, and guides the conveyance position for the recording medium P such that a cut paper sheet P2 that is a recording medium for the two-sided printing (the duplex printing) conveyed from the single-side printed material ejection exit 104 toward the thermal head 205 does not enter the first recording medium holding unit 201 when the duplex printing is executed.

In the printer unit 101, a first cutter mechanism (first cutting unit) 212 is disposed in a vicinity of the single-side printed material ejection exit 104. The first cutter mechanism 212 includes a stationary blade whose position is fixed, and a movable blade that is in contact with the stationary blade and disposed at a position dividing the first recording medium conveyance path 202 (whose reference numerals are not given). The movable blade has a disk-shape with a blade on the outer peripheral portion, and is disposed to be movable (reciprocal motion) in the width direction of the recording medium along the stationary blade. The movable blade is positioned at a position at which the movable blade does not obstruct the passage of the recording medium when the movable blade does not operate such as a case where the movable blade stands by to cut the recording medium.

The first cutter mechanism 212 includes a driving source such as a motor to drive the movable blade; a power transmission mechanism not depicted that transmits the driving force generated by the motor to drive the movable blade, to the movable blade; etc. The first cutter mechanism 212 cuts the recording medium P by causing the movable blade to move in the width direction of the recording medium P using the driving force generated by the motor to drive the movable blade after a cutting position of the recording medium P (that is, a position thereof to be cut) is conveyed to a position at which the movable blade travels across the first recording medium conveyance path 202 in the first recording medium conveyance path 202 (that is, a cutting position for cutting by the first cutter mechanism 212).

The printer unit 101 includes a grip roller 213 and a pinch roller 214. The grip roller 213 includes protrusions that protrude toward the outer periphery thereof; abuts the recording medium P on the first surface of thereof; and abuts the recording medium P from the back surface of the recording surface thereof during the recording operation executed by the recording unit 204. The pinch roller 214 is disposed facing the grip roller 213 with the first recording medium conveyance path 202 therebetween.

The grip roller 213 and the pinch roller 214 hold the recording medium P conveyed in the first recording medium conveyance path 202. Slipping between the grip roller 213 and the recording medium P can be prevented by securing the forces of the grip roller 213 and the pinch roller 214 to be able to hold and convey the recording medium therebetween (gripping forces) to sufficiently be stronger than the loads applied to the recording medium from the recording unit and the paper sheet conveyance path.

When the grip roller 213 and the pinch roller 214 hold the recording medium P therebetween, the position of the recording medium P can be controlled for the recording position defined by the thermal head 205 and the platen 206, by rotating the grip roller 213. In this embodiment, the grip roller 213 and the pinch roller 214 can realize a position control unit.

In the printer unit 101, a first margin strip accommodating unit 215 is disposed at a position that is in a vicinity of the single-side printed material ejection exit 104 and that is under the first cutter mechanism 212 when the printer 100 is placed. The first margin strip accommodating unit 215 includes an opening that is in an upper portion when the printer 100 is in an installed state, and accommodates through the opening, a margin strip produced by the operation of the first cutter mechanism 212.

The first margin strip accommodating unit 215 is disposed to be detachable from the housing 101a of the printer unit 101. A user of the printer 100 can easily discard the margin strip produced by the operation of the first cutter mechanism 212 by detaching the first margin strip accommodating unit 215 from the housing 101a of the printer unit 101.

The paper-feeding/paper-reversing unit 102 operates by receiving the supply of electric power from a power source disposed on the printer unit 101; and includes a second recording medium holding unit 216. The second recording medium holding unit 216 holds the recording medium P that has a recording layer disposed on both surfaces of the base material and that is suitable for the duplex printing; and holds sheet recording media P, stacking the sheet recording media P on one another. The recording medium held by the second recording medium holding unit 216 will arbitrarily be referred to as "cut paper sheet" and will be described with a reference numeral "P2".

The paper-feeding/paper-reversing unit 102 includes a second recording medium conveyance path 217. The second recording medium conveyance path 217 is formed between the first recording medium conveyance path 202 and the second recording medium holding unit 216 in the printer unit 101, and spans from the second recording medium holding unit 216 to the first recording medium conveyance path 202. The paper-feeding/paper-reversing unit 102 includes paper sheet conveying rollers 218A and 218C that convey the recording medium P present in the second recording medium conveyance path 217, in the direction from the second recording medium holding unit 216 toward the first recording medium conveyance path 202.

The paper-feeding/paper-reversing unit 102 includes a sheet feeding mechanism (sheet feeding unit) 219. The sheet feeding mechanism 219 feeds to the second recording medium conveyance path 217, the sheet recording media P (the cut paper sheets P2) held by the second recording medium holding unit 216, separating the sheet recording media P from one another; and includes a paper sheet sliding roller 220 and a paper sheet separating unit (friction sheet) 221.

The paper sheet sliding roller 220 abuts the recording medium P (hereinafter, arbitrarily referred to as "highest level paper sheet") at the highest level of the stacked recording media P (the cut paper sheets P2) held by the second recording medium holding unit 216; and can be formed using, for example, a silicon rubber. The sheet feeding mechanism 219 includes a biasing mechanism 222 that biases the paper sheet sliding roller 220 such that the paper sheet sliding roller 220 always abuts the highest level paper sheet regardless of the amount of the recording media (the number of paper sheets) held by the second recording medium holding unit 216.

In this embodiment, the respective surfaces of the paper sheet sliding roller 220, the paper sheet conveying roller 218A, and the paper sheet separating unit (the friction sheet) 221 are not smooth and have a nubby shape. The respective surfaces of the paper sheet sliding roller 220, the paper sheet conveying roller 218A, and the paper sheet separating unit (the friction sheet) 221 may be structured to not be smooth and may have recesses or protrusions disposed thereon. For example, the respective surfaces of the paper sheet sliding roller 220, the paper sheet conveying roller 218A, and the paper sheet separating unit (the friction sheet) 221 can be made to be not smooth by applying thereto, for example, embossing or processing for elephant skin texture.

Figure 2:
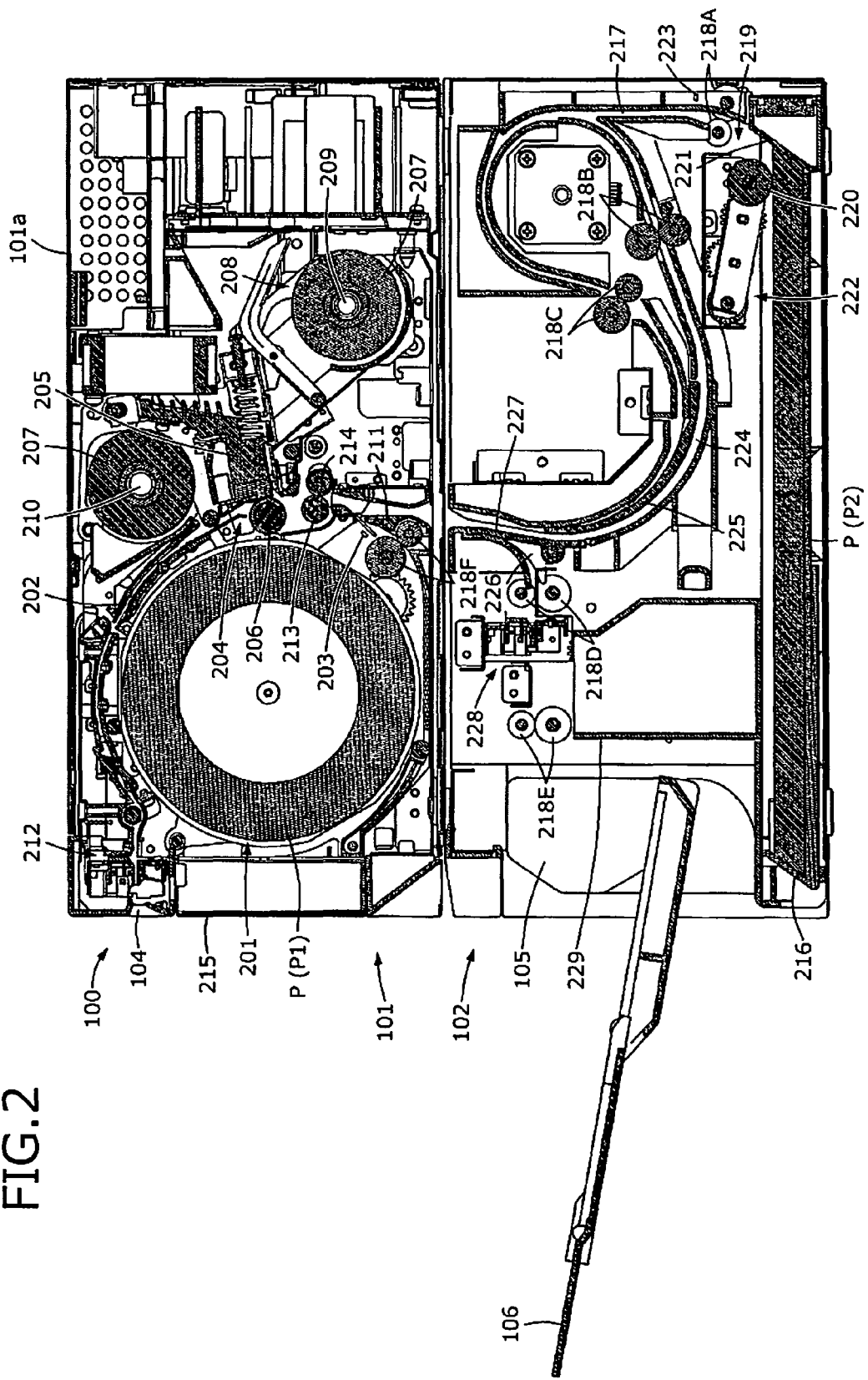
FIG. 2 is a cross-sectional diagram taken at A-A of FIG. 1 (part 1)
Figure 3:
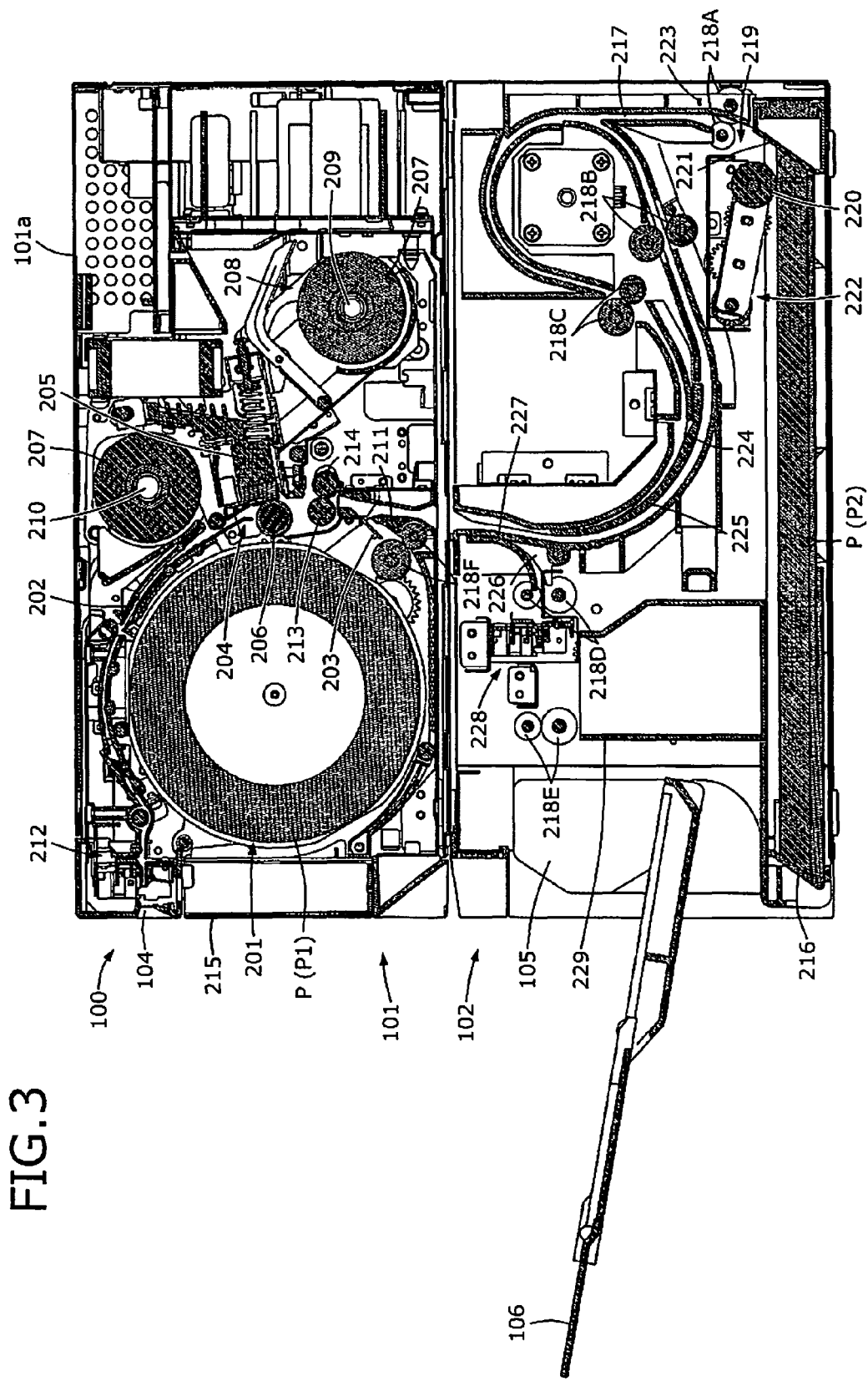
FIG. 3 is a cross-sectional diagram taken at A-A of FIG. 1 (part 2)

When the recording media P (the cut paper sheets P2) held by the second recording medium holding unit 216 are fed to the second recording medium conveyance path 217, the paper sheet sliding roller 220 is caused to abut the highest level paper sheet and is rotated counterclockwise in FIG. 2, centered about the shaft of the paper sheet sliding roller 220. Thereby, the highest level paper sheet is moved in a direction from the right-hand side of the page in FIG. 2, to the second recording medium conveyance path 217 by the frictional force between the paper sheet sliding roller 220 and the highest level paper sheet.

In this case, plural recording media P (the cut paper sheets P2) simultaneously start to move toward the second recording medium conveyance path 217 due to the friction between the recording medium P (the cut paper sheet P2) that is the highest level paper sheet and a recording medium P (a cut paper sheet P2) stacked at a level lower than that of the highest level paper sheet, the friction between recording media P (cut paper sheets P2) stacked at the lower levels, etc. The paper sheet separating unit (the friction sheet) 221 is disposed in the second recording medium holding unit 216 (on the right-hand side of the page in FIG. 2) and therefore, the plural recording media P (the cut paper sheets P2) starting to move toward the second recording medium conveyance path 217 due to the rotation of the paper sheet sliding roller 220 all abut the paper sheet separating unit (friction sheet) 221. A blocking force to block the movement acts against the plural recording media P (the cut paper sheets P2) starting to move toward the second recording medium conveyance path 217, and the movement of the plural recording media P (the cut paper sheets P2) stops.

The material forming or the surface shape of the paper sheet sliding roller 220 is adjusted such that the frictional force acting between the recording medium P (the cut paper sheet P2) held by the second recording medium holding unit 216 and the paper sheet sliding roller 220 is greater than the frictional force acting between the end of the recording medium P (the cut paper sheet P2) and the paper sheet separating unit (friction sheet) 221. The material forming or the surface shape of the paper sheet separating unit (friction sheet) 221 is adjusted such that the frictional force acting between the end of the recording medium P (the cut paper sheet P2) and the paper sheet separating unit (friction sheet) 221 is greater than the frictional force acting between the recording media P (the cut paper sheets P2).

Thereby, the sheet feeding mechanism 219 can feed the highest level paper sheet directly in contact with the paper sheet sliding roller 220 alone, among the plural recording media P (the cut paper sheets P2) starting to move toward the second recording medium conveyance path 217 due to rotation of the paper sheet sliding roller 220, from the second recording medium holding unit 216 to the second recording medium conveyance path 217.

A second paper sheet sensor 223 is disposed in a vicinity of the border position between the second recording medium holding unit 216 and the second recording medium conveyance path 217. The output value of the second paper sheet sensor 223 varies corresponding to presence or absence of the recording medium P fed from the second recording medium holding unit 216 to the second recording medium conveyance path 217. For example, similarly to the first paper sheet sensor 203, the second paper sheet sensor 223 can be realized by a micro switch or a photosensor.

The paper-feeding/paper-reversing unit 102 includes a third recording medium conveyance path 224. The third recording medium conveyance path 224 partially overlaps the second recording medium conveyance path 217. The third recording medium conveyance path 224 has a loop shape whose both ends continue to the first recording medium conveyance path 202. The paper-feeding/paper-reversing unit 102 includes a paper sheet conveying roller 218B that conveys the recording medium P ejected from the first recording medium conveyance path 202, to the third recording medium conveyance path 224 in a direction to feed the recording medium P again to the first recording medium conveyance path 202 through the third recording medium conveyance path 224.

The third recording medium conveyance path 224 has the loop shape and therefore, the recording medium P ejected from the first recording medium conveyance path 202 to the third recording medium conveyance path 224 is conveyed in the third recording medium conveyance path 224 by the paper sheet conveying rollers 218B and 218C and thereby, is again fed to the first recording medium conveyance path 202. The recording medium P conveyed in the third recording medium conveyance path 224 is again fed to the first recording medium conveyance path 202 being turned over with respect to the recording position of the recording unit 204 (the position facing the heating elements of the thermal head 205) by being conveyed in the third recording medium conveyance path 224. In the printer 100 of the embodiment, a reversing unit can be realized by the third recording medium conveyance path 224, the paper sheet conveying rollers 218B and 218C that convey the recording medium P in the third recording medium conveyance path 224, the mechanism that provides the driving forces to the paper sheet conveying rollers 218B and 218C, etc.

Of these paper sheet conveying rollers, the paper sheet conveying roller 218B present at a position for the recording medium P to reach during the recording operation is disposed to be able to retreat to a position at which the paper sheet conveying roller 218B is not in contact with the recording medium P during the recording operation. For example, a mechanism whose roller position swings associated with a series of gears between the paper sheet conveying roller 218B and the motor (not depicted) is disposed and thereby, a roller (pressing roller) passively rotating of the paper sheet conveying roller 218B operate to be pressed onto the recording medium P when the motor supplying the driving force to the paper sheet conveying roller 218B rotates in the conveyance direction of the recording medium P, and the passive roller moves to be away from the recording medium P when the motor rotates in the opposite direction and thereby, the reversing unit can be realized.

The driving of the paper sheet sliding roller 220 and the driving of the paper sheet conveying rollers 218A, 218B, and 218C can be executed by the one motor by switching the rotation direction of the motor when a one-way clutch disconnecting the driving by idle rotation, which is rotation in the opposite direction, is inserted into the series of gears between the motor supplying the power and each of the rollers. However, in this case, preferably, a proper amount of looseness (leeway) is provided among the series of gears between the motor and the paper sheet sliding roller 220. Thereby, even when the motor corresponding to the paper sheet conveying roller 218B is reversely rotated to the position for the paper sheet conveying roller 218B to retreat after the recording medium P (the cut paper sheet P2) is turned over, the configuration can be set such that the recording medium P (the cut paper sheet P2) held by the second recording medium holding unit 216 is not slid.

Among the paper sheet conveying rollers 218 included in the paper-feeding/paper-reversing unit 102, the paper sheet conveying roller 218C disposed at the position at which the turned over recording medium P passes, acts also as a cleaning roller. The paper sheet conveying roller 218C acting also as the cleaning roller conveys the recording medium P and cleans up the surface on which the recording operation is executed (the back surface) when the recording medium P is again fed to the printer unit 101.

In the third recording medium conveyance path 224, a flap 225 is disposed in the portion thereof that overlaps the second recording medium conveyance path 217. The flap 225 guides the conveyance position in the third recording medium conveyance path 224 of the recording medium P that is ejected from the first recording medium conveyance path 202 to the third recording medium conveyance path 224; and is positioned at a different position for each of the cases where the recording medium P is ejected from the first recording medium conveyance path 202 to the third recording medium conveyance path 224 and where the recording medium P is fed from the third recording medium conveyance path 224 to the first recording medium conveyance path 202 (see FIGS. 2 and 4).

Figure 4:
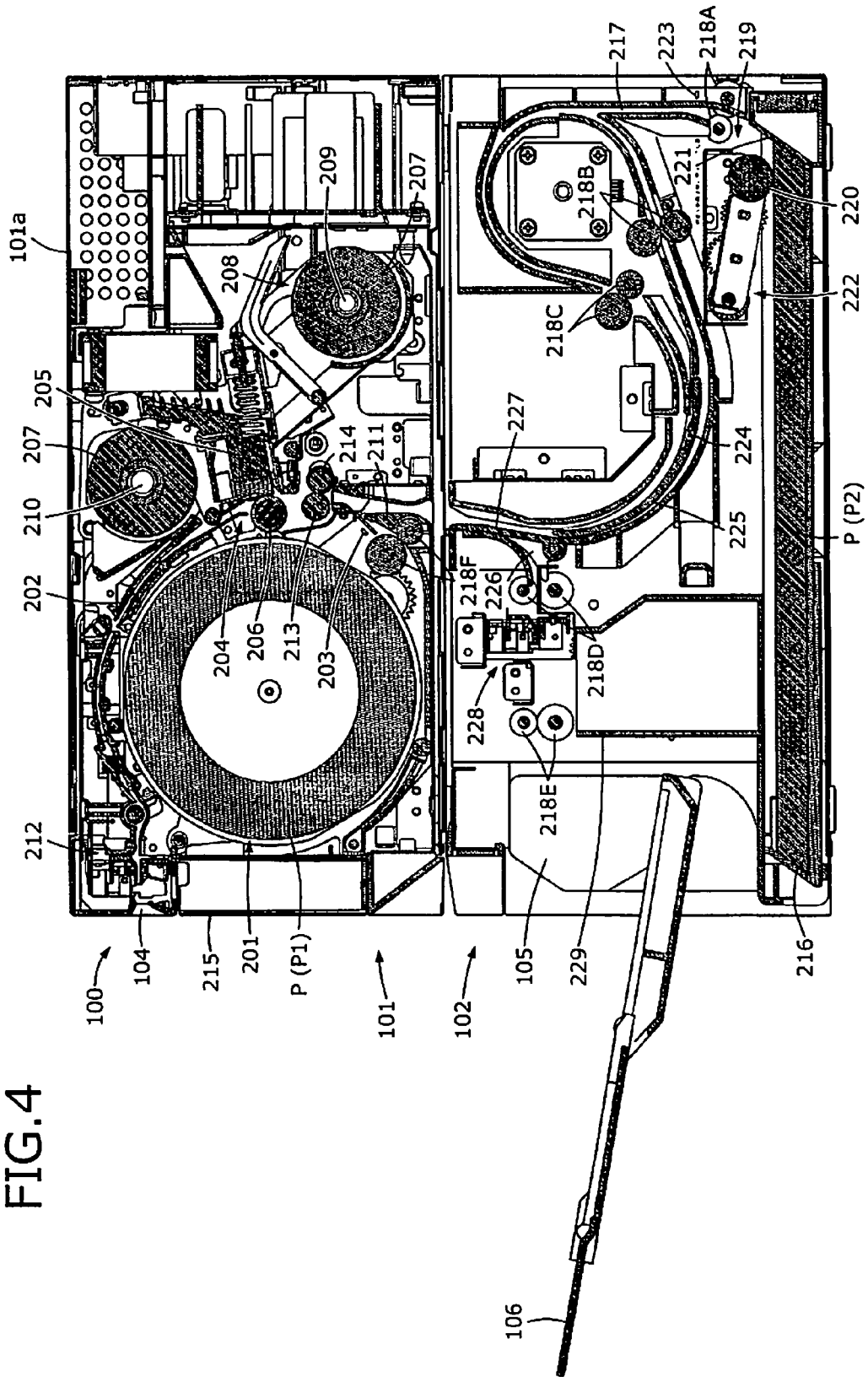
FIG. 4 is a cross-sectional diagram taken at A-A of FIG. 1 (part 3)
Figure 5:
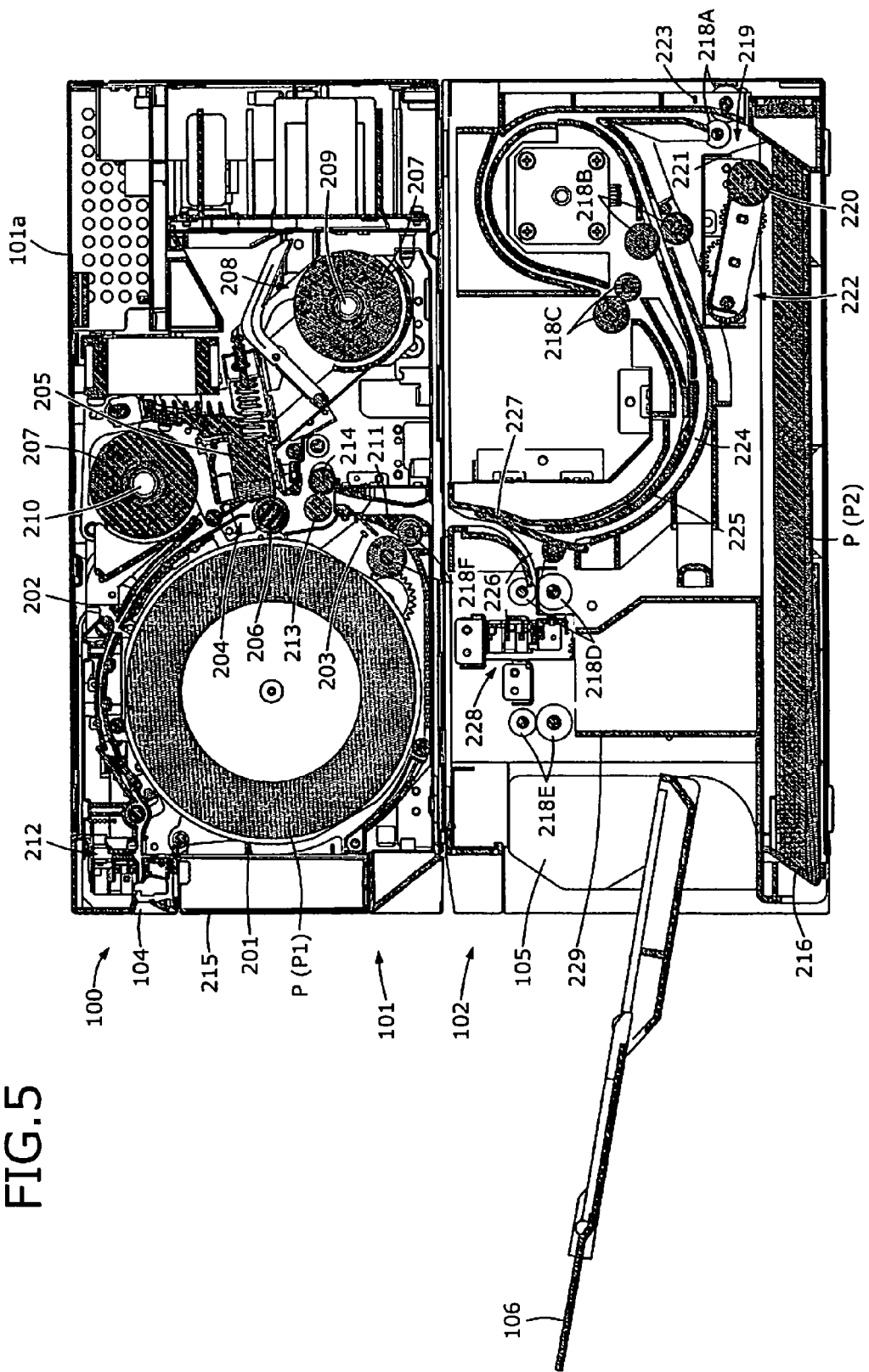
FIG. 5 is a cross-sectional diagram taken at A-A of FIG. 1 (part 4)

For example, the flap 225 is positioned at a position depicted in FIG. 2 when the recording medium is ejected from the first recording medium conveyance path 202 to the third recording medium conveyance path 224; and is positioned at a position depicted in FIG. 4 when the recording medium is fed from the third recording medium conveyance path 224 to the first recording medium conveyance path 202.

The paper-feeding/paper-reversing unit 102 includes a fourth recording medium conveyance path 226. The fourth recording medium conveyance path 226 is formed between the duplex printed material ejection exit 105 that leads to the second recording medium ejection position and an end toward the paper-feeding/paper-reversing unit 102 of the first recording medium conveyance path 202, and spans from the first recording medium conveyance path 202 to the duplex printed material ejection exit 105. The paper-feeding/paper-reversing unit 102 includes paper sheet conveying rollers 218D and 218E that convey the recording medium P ejected from the first recording medium conveyance path 202 into the fourth recording medium conveyance path 226, in the direction from the first recording medium conveyance path 202 toward the duplex printed material ejection exit 105.

Being held between the grip roller 213 and the pinch roller 214, the recording medium P ejected from the first recording medium conveyance path 202 into the fourth recording medium conveyance path 226 is subject to a conveying force of the paper sheet conveying rollers 218D and 218E; and thereby, is conveyed in the direction toward the outside of the paper-feeding/paper-reversing unit 102 through the duplex printed material ejection exit 105. In this embodiment, the paper sheet conveying rollers 218D and 218E, the grip roller 213, the pinch roller 214, etc., can realize a recording medium ejecting unit that conveys the recording medium P ejected from the first recording medium conveyance path 202 into the fourth recording medium conveyance path 226 up to the outside of the paper-feeding/paper-reversing unit 102 (the second recording medium ejection position) through the duplex printed material ejection exit 105.

In the third recording medium conveyance path 224, a flap 227 is disposed at a portion overlapping the second recording medium conveyance path 217 and at a border position with the fourth recording medium conveyance path 226. The flap 227 guides the conveyance position of the recording medium ejected from the printer unit 101 to the paper-feeding/paper-reversing unit 102 through the first recording medium conveyance path 202; and is selectively positioned at any one among a position for the flap 227 to prevent the recording medium P ejected from the printer unit 101 to the paper-feeding/paper-reversing unit 102 through the first recording medium conveyance path 202, from entering the fourth recording medium conveyance path 226 (see FIGS. 2, 3, and 4) and a position for the flap 227 to guide the recording medium P to the fourth recording medium conveyance path 226 (see FIG. 5).

A second cutter mechanism (a second cutting unit) 228 is disposed in a vicinity of the duplex printed material ejection exit 105 in the paper-feeding/paper-reversing unit 102. The second cutter mechanism 228 is disposed at a position by which the distance between the cutting position by the second cutter mechanism 228 and the paper sheet conveying rollers 218 such as the grip roller 213 included in the printer unit 101 is shorter than the length of the smallest printed object that can be recorded on the recording medium P (the cut paper sheet P2) in the printer 100.

The second cutter mechanism 228 has a configuration identical to that of the first cutter mechanism 212 and includes a stationary blade whose position is fixed, and a movable blade disposed at a position to face the stationary blade with the second recording medium conveyance path 217 therebetween (whose reference numerals are not given). The second cutter mechanism 228 has a configuration identical to that of the first cutter mechanism 212 and therefore, will not again be described.

In the printer 100 of the embodiment, the flap 227 is operated by a driving force of the motor that drives the paper sheet conveying rollers 218D and 218E disposed in the fourth recording medium conveyance path 226. The motor that drives the flap 227 acts to drive the paper sheet conveying rollers 218D and 218E disposed in the fourth recording medium conveyance path 226 and also acts to drive the flap 227.

For example, a gear is disposed on a fulcrum shaft to be the fulcrum for the flap 227 to turn and the gear is coupled with the series of gears that drive the paper sheet conveying rollers 218D and 218E on the ejection side, using a clutch mechanism (torque limiter) not depicted. The flap 227 is adapted to move in the direction by which the recording medium P is lead in a direction for the recording medium P to be ejected from the duplex printed material ejection exit 105 when the motor is driven to rotate the paper sheet conveying rollers 218D and 218E in the direction for the recording medium P to be ejected into the fourth recording medium conveyance path 226 (the position in FIG. 5). The flap 227 is adapted to move in a direction to lead the recording medium P toward the third recording medium conveyance path 224 when the motor is driven to rotate the paper sheet conveying rollers 218D and 218E in the direction opposite to the direction for the recording medium P to be ejected in the fourth recording medium conveyance path 226 (the position in FIG. 2). A paper sheet conveying roller 218F is rotated in a predetermined direction when the recording medium P (the rolled paper P1) held by the first recording medium holding unit 201 is pulled out from the first recording medium holding unit 201 into the first recording medium conveyance path 202.

In the paper-feeding/paper-reversing unit 102, a second margin strip accommodating unit 229 is disposed in a vicinity of the duplex printed material ejection exit 105 and at a position that is under the second cutter mechanism 228 when the printer 100 is in an installed state. The second margin strip accommodating unit 229 includes an opening that is on an upper portion when the printer 100 is in an installed state, and through the opening, accommodates a margin strip produced by the operation of the second cutter mechanism 228.

The second margin strip accommodating unit 229 is disposed to be detachable from the housing 101a of the paper-feeding/paper-reversing unit 102. A user of the printer 100 can easily discard the margin strip produced by the operation of the second cutter mechanism 228 by detaching the second margin strip accommodating unit 229 from the housing 101a of the paper-feeding/paper-reversing unit 102.

The printer 100 of the embodiment may be configured to execute, using one motor, the operation of feeding the sheet recording medium P (the cut paper sheet P2) held by the second recording medium holding unit 216 to the second recording medium conveyance path 217 (a paper sheet sliding operation), and an operation of conveying the recording medium P (the cut paper sheet P2) fed (slid) to the second recording medium conveyance path 217, from the paper-feeding/paper-reversing unit 102 to the printer unit 101.

For example, this configuration can be realized by a configuration where, when a one-way clutch is disposed in each series of gears up to the paper sheet sliding roller 220 that feeds (slides) the recording medium P (the cut paper sheet P2) to the second recording medium conveyance path 217, and the paper sheet conveying rollers 218A, 218B, and 218C that convey the recording medium P from the paper-feeding/paper-reversing unit 102 to the printer unit 101 and the paper sheet sliding roller 220 is driven, the one-way clutch idly rotates in each series of gears up to the paper sheet conveying rollers 218A, 218B, and 218C and no driving force is transferred thereby; and, when the paper sheet conveying rollers 218A, 218B, and 218C are driven, the one-way clutch in the series of gears up to the paper sheet sliding roller 220 idly rotates and no driving force is transferred thereby.

Thus, the plural operations can be selectively executed using one motor according to the rotation direction of the motor driving the sheet feeding mechanism 219, such as sliding the recording medium P (the cut paper sheet P2) or conveying the recording medium P (the cut paper sheet P2) without executing the paper sheet sliding operation, in the second recording medium conveyance path 217 and the third recording medium conveyance path 224.

Figure 6:
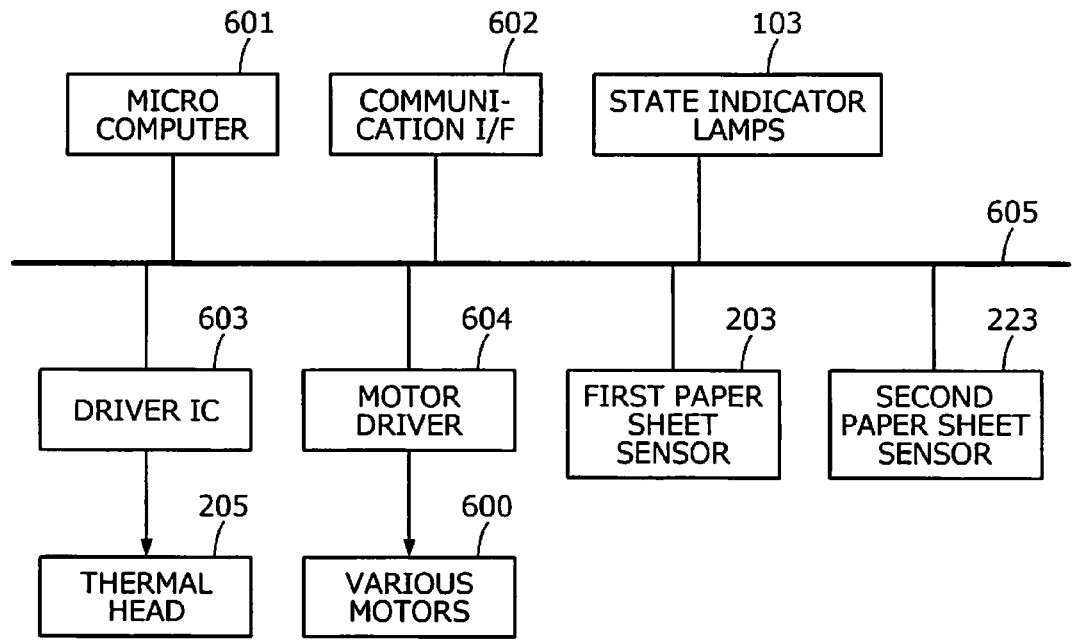
FIG. 6 is a diagram for explaining a hardware configuration of the printer of the embodiment.

A hardware configuration of the printer 100 of the embodiment will be described. FIG. 6 is a diagram for explaining the hardware configuration of the printer 100 of the embodiment. In FIG. 6, the printer 100 includes a micro computer 601, a communication interface I/F 602, a driver IC 603, a motor driver 604, the state indicator lamps 103, and the first and the second paper sheet sensors 203 and 223. The components from the micro computer 601 to the second paper sheet sensor 223 are connected to one another by a bus 605.

The micro computer 601 drives and controls the components included in the printer 100, and can be realized by, for example, a circuit board having a CPU, a memory such as a ROM or a RAM, and various circuits such as an input and output circuit and a timer circuit, mounted thereon. In the printer 100 of this embodiment, the micro computer 601 can realize a control unit that drives and controls the components included in the printer unit 101 and the paper-feeding/paper-reversing unit 102.

The micro computer 601 drives and controls the components included in the printer 100 by executing on the CPU and based on various kinds of data stored in the memory and received from an external apparatus through the communication I/F 602, various types of control program stored in the memory. In the micro computer 601, the CPU uses, for example, the RAM as a work area when the CPU expands image data for the printing, based on recording instruction information.

The communication I/F 602 is connected to an external apparatus not depicted, supervises the interface between a network and the internal components, and controls the input and output of data with respect to a computer apparatus. For example, the external apparatus generates the recording instruction information for the printer 100 and outputs the generated recording instruction information to the printer 100. The recording instruction information includes, for example, information concerning an image, etc., to be recorded on the recording medium P, a command to instruct the recording of the information, etc. The external apparatus can be realized by, for example, a personal computer installed in a DPE (development, printing, and enlargement) shop (a shop that is in the business of developing, printing, and enlarging photographs) that provides a service of outputting by printing images taken by digital cameras.

When the micro computer 601 receives an input of the recording instruction information output from the external apparatus through the communication I/F 602, the micro computer 601 produces pseudo recorded image data (see FIG. 7) based on the recording instruction information. For the printer 100 of the embodiment, the micro computer 601 can implement a pseudo recorded image data producing unit.

The driver IC 603 is driven and controlled by the micro computer 601, and selectively supplies electric power to electrode wires corresponding to the plural heating elements in the thermal head 205 by being driven and controlled by the micro computer 601. Thereby, the driver IC 603 can selectively cause the heating elements to heat. The heat generated by the heating elements of the thermal head 205 is transferred to the recording layer of the recording medium P through the ink ribbon 207 and thereby, the sublimation dye ink disposed on the ink ribbon 207 can be sublimated and transferred to the recording medium P. Thus, the recording operation can be executed for the recording medium P.

A motor driver 604 is driven and controlled by the micro computer 601 and, by being driven and controlled by the micro computer 601, drives and controls various motors 600 such as the motor for the grip roller 213, the motor for the paper sheet conveying rollers 218A, 218B, and 218C, the motor for the paper sheet conveying rollers 218D and 218E, the motor for the paper sheet sliding roller 220, the motor for driving the movable blade, and the motor to move the thermal head 205.

The motor for the grip roller 213, the motor for the paper sheet conveying rollers 218A, 218B, and 218C, the motor for the paper sheet conveying rollers 218D and 218E, and the motor for the paper sheet sliding roller 220 each can be implemented by, for example, a stepping motor. The motor to drive the movable blade can be implemented by, for example, a DC motor. The motor driver 604 can be disposed respectively for the motor for the grip roller 213, the motor for the paper sheet conveying rollers 218, the motor to drive the movable blade, etc.

The motor driver 604 drives and controls the corresponding motors based on a control signal from the micro computer 601 and switches the excitation sequence of or the direction of the current to be applied to each of the various motors 600. Each of the various motors 600 is driven and controlled by the motor driver 604 and thereby, converts the electrical energy into the mechanical energy to generate a rotational driving force. The rotation direction of each of the various motors 600 is switched according to the switching by the motor driver 604 of the excitation sequence of or the direction of the current applied to each of the motors 600.

Each of the state indicator lamps 103 is driven and controlled by the micro computer 601; is turned on or off according to the state of the printer 100; can be implemented by, for example, a LED; and is turned on or off according to the information to be indicated such as, for example, the supply state of the power source to the printer 100, presence or absence of error occurrence in the printer 100, or presence or absence of the recording medium P.

The state indicator lamps 103 may be disposed respectively for each type of information to be indicated. Alternatively, for example, each of the state indicator lamps 103 may have a light emission color that differs for each type of information to be indicated. Further, each of the state indicator lamps 103 may have a lighting pattern that differs according to type of information to be indicated, such as, for example, blinking or turning on.

The output values of the first and the second paper sheet sensors 203 and 223 input into the micro computer 601, may be output values that are always to be input into the micro computer 601 or may be output values that are to be input into the micro computer 601 when a variation occurs among the output values.

The arrangement density of the protrusions on the grip roller 213 will be described. The grip roller 213 includes the protrusions on an outer circumferential surface; thereby, securely grips the surface of the recording medium P; and can secure high conveyance precision for conveying the recording medium P. On the other hand, the grip roller 213 includes the protrusions on an outer circumferential surface and thereby, the portions in contact with the protrusions for conveyance are dented on the first surface of the recording medium P. It is difficult for the dented portions to tightly contact with the ink ribbon, and the ink tends to not be transferred well onto the dented portions. Therefore, on the first surface of the recording medium P, portions remaining in white (protrusion marks) that are the portions onto which the ink is not transferred well are generated on the recording surface (first surface of the recording medium P) on which the recording operation is executed after the recording surface abuts the grip roller 213.

If the pitch of the protrusions on the grip roller 213 is decreased, drops in the average darkness of the overall recorded image due to the portions remaining in white (the protrusion marks) are suppressed. However, each of the white dots that are the protrusion marks becomes conspicuous. If the pitch of the protrusions on the grip roller 213 is increased, each of the white dots tends to be inconspicuous (substantially ignorable for the human perception). However, areas that include the portions remaining in white (the protrusion marks) increase and therefore, in the overall recorded image, drops in the darkness becomes conspicuous compared to the areas that include no portion remaining in white (the protrusion mark). If the pitch of the protrusions on the grip roller 213 is excessively increased, of the degree to which the darkness drops becomes large; in addition, the conveyance force to convey the recording medium P is reduced; and the recording position is shifted for each color; etc. Therefore, excessively increasing the pitch of the protrusions causes of troubles as above are generated.

Therefore, preferably, the grip roller 213 included in the printer 100 of the embodiment includes the protrusions disposed thereon at an arrangement density such that the pitch of the protrusion marks on the first surface of the recording medium P in contact with the grip roller 213 is about 8 to 22 points/mm2. However, the arrangement density of the protrusions on the grip roller 213 is not limited to the range of 8 to 22 points/mm2 and can be set arbitrarily according to the type of the recording medium P to be recorded on (the surface smoothness, the thickness, the hardness, etc.).

Figure 7:
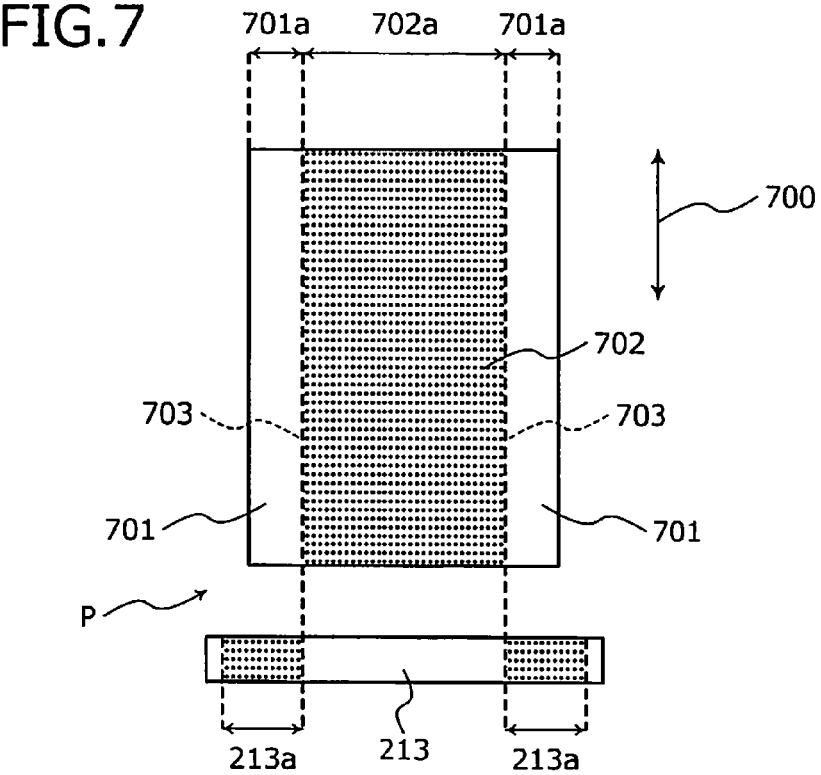
FIG. 7 is a diagram for explaining an example of a pseudo pixel image.

An example of pseudo recorded image data produced by the micro computer 601 will be described. FIG. 7 is a diagram for explaining an example of a pseudo pixel image. FIG. 7 depicts a pseudo pixel image that is obtained on the recording surface (first surface of the recording medium P), when the recording operation is executed according to the pseudo recorded image data.

In FIG. 7, the pseudo recorded image data includes pseudo pixels (see dots in a second area 702) obtained by correcting the density of each predetermined pixel determined according to the arrangement pattern of the protrusions on the grip roller 213, among the pixels to be recorded in the second area 702, which excludes a first area 701 that in contact with the protrusions on the grip roller 213, on the first surface of the recording medium P conveyed by the grip roller 213. The pseudo recorded image data includes the pseudo pixels only in the second area 702.

The first area 701 corresponds to an area that continuously spreads in the conveyance direction of the recording medium P. The second area 702 corresponds to an area having a width denoted by a reference numeral "702a" and continuously spreading in the conveyance direction of the recording medium P. A width 701a is defined by a width 213a of an area having the protrusions disposed therein on the grip roller 213. The width 702a is defined by a width between the areas each having the protrusions disposed therein on the grip roller 213. In FIG. 7, a reference numeral 703 denotes a border between the first and the second areas 701 and 702.

For example, when the protrusions are disposed on the grip roller 213 such that the pitch of the protrusion marks on the first surface of the recording medium P is about 8 to 22 points/mm2, the protrusion marks in the first area 701 are generated at the pitch of about 8 to 22 points/mm2, which matches the arrangement density of the protrusions. When this grip roller 213 is used, the micro computer 601 produces the pseudo recorded image data with which the pseudo pixels are recorded at the pitch of about 8 to 22 points/mm2 or a higher pitch in the second area 702.

A pixel is the smallest unit constituting an image and retains color information therefor. The color information is information indicating densities of colors of red (R), green (G), and blue (B) of each pixel, and expresses the color of each pixel using the balance of the densities of these colors. The micro computer 601 converts, from RGB colors into CMY (cyan (C), magenta (M), and yellow (Y)) colors, the color information of each pixel constituting the image represented by the recording instruction information received from the external apparatus.

The pseudo pixels can be produced by correcting the density (the original density) of each of the predetermined pixels in the image represented by the recording instruction information received from the external apparatus. The micro computer 601 produces the pseudo recorded image data, which includes the pseudo pixels obtained by correcting the density of each of the predetermined pixels by reducing the density of each of the predetermined pixels in the second area 702 to be lower than the densities of the pixels surrounding the predetermined pixels.

For example, the micro computer 601 can produce the pseudo recorded image data by executing the correction by reducing, at a predetermined ratio, the density of each of the predetermined pixels in the pseudo recorded image data to be lower than the density (the original density) of each of the predetermined pixels in the image represented by the recording instruction information received from the external apparatus.

The micro computer 601 produces the pseudo recorded image data by, for example, reducing the densities of all colors of C, M, and Y of each of the pseudo pixels. The micro computer 601 may produce the pseudo recorded image data by reducing the density(ies) of any one or two colors of C, M, and Y of each of the pseudo pixels.

When the densities of all the colors of C, M, and Y or any two colors thereof of each pseudo pixel are reduced, the densities are reduced at the same ratio to the original densities. When the densities of all the colors of C, M, and Y or any two colors thereof of each pseudo pixel are reduced, the densities may be reduced at ratios different from each other. The densities of each pseudo pixel are not reduced at the same ratio to the densities of the original image, and the ratio to reduce the densities may be increased for image darkness in which the protrusion marks tend to be conspicuous and may be decreased for image darkness in which the protrusion marks tend to be inconspicuous.

Figure 8B:
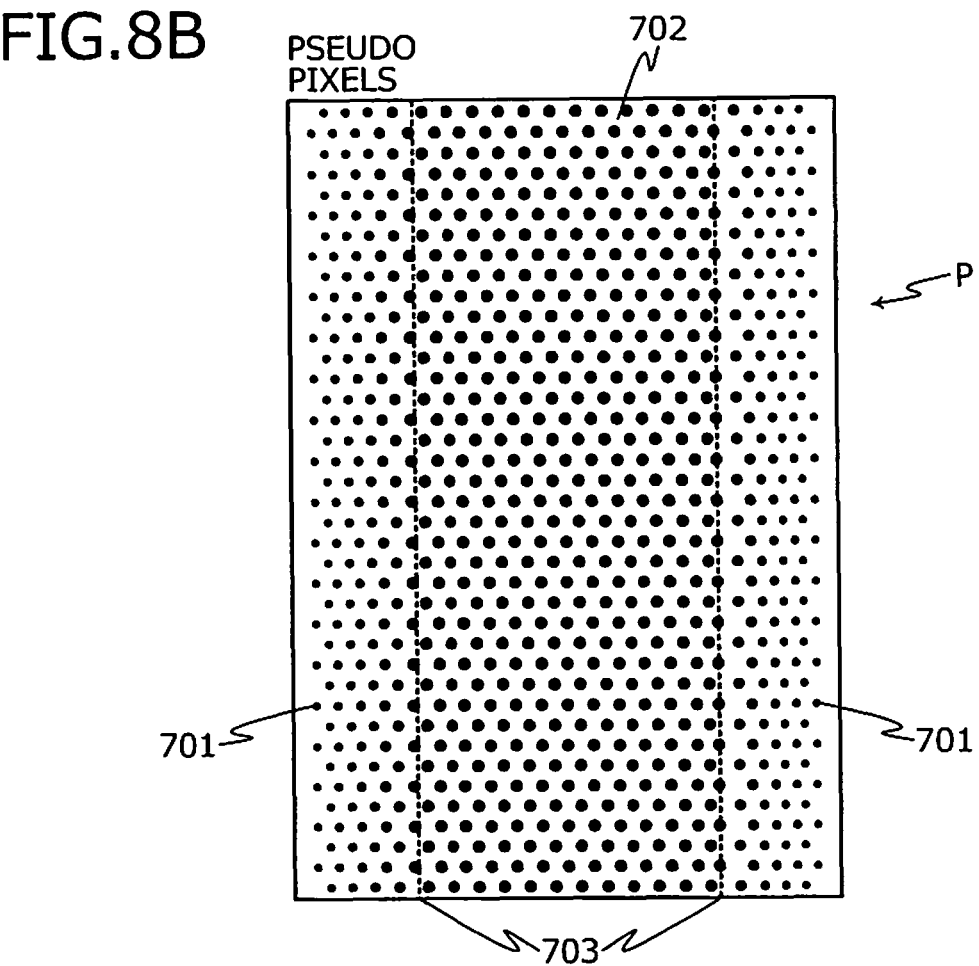
FIG. 8B is a diagram for explaining another example of a pseudo pixel image.

Another example of the pseudo pixel image will be described. FIG. 8B is a diagram for explaining another example of a pseudo pixel image. FIG. 8B depicts a pseudo pixel image on the recording surface (the first surface of the recording medium P), obtained when the recording operation is executed according to the pseudo recorded image data that includes pseudo pixels of a pattern different from that of the pseudo pixels depicted in FIG. 7.

As depicted in FIG. 8B, the micro computer 601 may reduce among the pixels to be recorded in the second area 702, the densities at a predetermined ratio for the predetermined pixels determined corresponding to the arrangement pattern of the protrusions on the grip roller 213; among the pixels to be recorded in the first area 701, may increase, for the predetermined pixels determined corresponding to the arrangement pattern of the protrusions on the grip roller 213, the density correction amount (to further reduce the density and the transparency) for each predetermined pixel at a position that is closer to the border 703 with the second area 702 than the predetermined pixels at positions farther from the border 703; and thereby, may produce the pseudo recorded image data to include the pseudo pixels that are at positions close to the border 703 and whose density correction amounts are set to be close to the density correction amounts of the pseudo pixels in the second area.

In this case, the micro computer 601 increases the density reduction amount for the density of each predetermined pixel in the original image data by the pseudo pixels at positions close to the border 703 to be greater than the density reduction amount for the density of each predetermined pixel in the original image data by the pseudo pixels at positions far from the border 703, in the first area 701.

In this case, the micro computer 601 sets the density reduction amount of a pseudo pixel at a position closest to the border 703 of the pseudo pixels in the first area 701 to be equal to the density reduction amount of each pseudo pixel in the second area 702.

FIG. 8A is a diagram for explaining an example of an image of the protrusion marks. When the recording operation is executed according to the pseudo recorded image data that includes the pseudo pixels of a pattern depicted in FIG. 8B, preferably, a setting is made by adjusting the pressure of the pinch roller 214 to push the recording medium P onto the grip roller 213 and the size of each of the protrusions on the grip roller 213, such that the size of each protrusion mark becomes larger as the position thereof becomes closer to either end of the recording medium P of the area (the first area 701) having the protrusion marks and the size of each protrusion mark becomes smaller as the position thereof becomes closer to the border 703 with the second area 702 that has no protrusion marks, as depicted in FIG. 8A. In this manner, by setting the darkness of the recorded medium in the first area 701 to gradually vary due to the protrusion marks such that (to be seen as if) the darkness becomes lower toward the ends of the recording medium P and becomes higher as the position therein becomes closer to the border 703.

In this case, for example, the pressure of the pinch roller 214 to push the recording medium P onto the grip roller 213 is adjusted such that the pressure becomes higher toward the ends of the recording medium P and becomes lower at a position closer to the border 703 with the second area 702. Alternatively, in this case, for example, the size of each protrusion of the grip roller 213 may be adjusted such that the size becomes larger toward the ends of the recording medium P and becomes smaller at a position closer to the border 703 with the second area 702.

If the size of the protrusions is constant on the grip roller 213 in the first area 701, the darkness of the recorded medium (the darkness of the recorded image on the first surface of the recording medium P) drastically varies at the border 703 between the area with the protrusions (the first area 701) and the area without any protrusions (the second area 702). The reduction of the darkness due to the protrusions tends to be conspicuous at the position at which such drastic variation of the darkness occurs in the recorded medium.

The variation of the darkness of the recorded medium generated due to the protrusions can be smoothed by adjusting the pressure of the pinch roller 214 and the size of each of the protrusions on the grip roller 213 such that the size of each of the protrusions becomes larger toward the ends of the recording medium P and becomes smaller at a position closer to the border 703 with the second area 702 without any protrusion, in the area with the protrusions (the first area 701), as above.

In this state, the recording operation is executed according to the pseudo recorded image data that includes the pseudo pixels of the pattern depicted in FIG. 8B and thereby, in the first area 701, the pseudo pixel image having pseudo pixels whose densities are decreased (reduced) more at a position closer to the border 703 than that at a position far from the border 703, is superimposed on the protrusion marks that cause the darkness of the recorded medium to vary (to be seen) to become lower toward the ends of the recording medium P and higher at a position closer to the border 703 (see FIG. 8A).

Figure 8C:
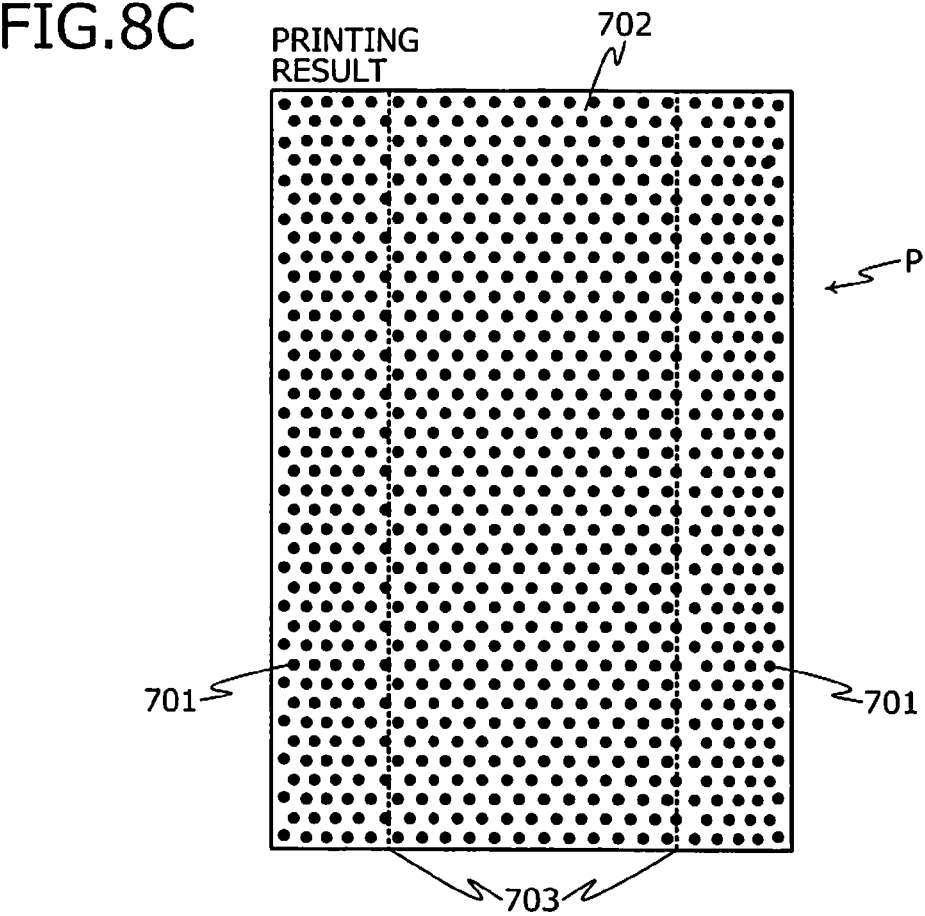
FIG. 8C is a diagram for explaining an example of a relation between pseudo pixels and the protrusion marks.

FIG. 8C is a diagram for explaining an example of a relation between the pseudo pixels and the protrusion marks. As depicted in FIG. 8C, the border 703 can be made to be more inconspicuous by superimposing on the area with the protrusion marks (the first area 701), the area having the pseudo pixels disposed therein that are set to have the densities corresponding to the reduction of the darkness due to the protrusion marks. Thereby, the reduction of the darkness of the recorded medium and, especially, the darkness difference at the border due to the protrusion marks can be caused to be more inconspicuous without reducing the conveying force for the recording medium P by the grip roller 213.

When the micro computer 601 receives the recording instruction information instructing the execution of the recording operation for both surfaces of the recording medium P (the first surface of the recording medium P) from the external apparatus, the micro computer 601 produces the pseudo recorded image data for the recording operation executed after the recording medium P is turned over for the recording position. Thereby, the protrusion marks can be caused to tend to be inconspicuous on the recording surface (the first surface of the recording medium P) on which the recording operation is executed after the recording surface abuts the grip roller 213.

Figure 9:
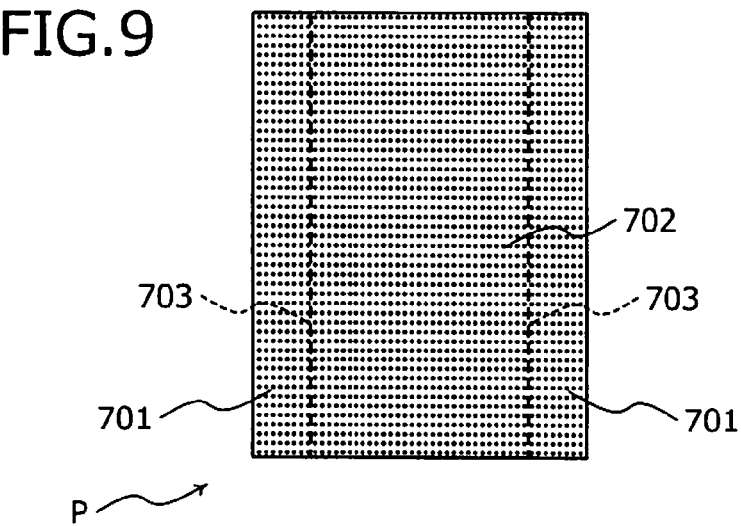
FIG. 9 is a diagram for explaining an example of a pseudo pixel image on a second surface of a recording medium P.

When the micro computer 601 receives the recording instruction information instructing the execution of the recording operation for both surfaces of the recording medium P from the external apparatus, the micro computer 601 may produce the pseudo recorded image data that includes the pseudo pixels obtained by correcting the densities of the predetermined pixels determined corresponding to the arrangement pattern of the protrusions on the grip roller 213, among the pixels recorded on the first surface of the recording medium P (the recording medium P before being turned over for the recording position, that is, the second surface of the recording medium P); and may execute the recording operation on the surface of the recording medium P (the second surface of the recording medium P) based on the pseudo recorded image data (see FIG. 9).

The pseudo recorded image data that is for the recording operation for the front surface of the recording medium P (the recording surface of the recording medium P before being turned over for the recording position, the second surface) will be described. FIG. 9 is a diagram for explaining an example of the pseudo pixel image on the second surface of the recording medium P. FIG. 9 depicts the pseudo pixel image on the recording surface, obtained when the recording operation is executed according to the pseudo recorded image data for the recording operation for the second surface of the recording medium P (the recording surface of the recording medium P before being turned over for the recording position).

As depicted in FIG. 9, the micro computer 601 produces the pseudo recorded image data that includes the pseudo pixels of the same pattern as that of the protrusion marks generated on the first surface of the recording medium P (the recording medium P after the being turned over for the recording position), as the pseudo recorded image data for the second surface of the recording medium P. The micro computer 601 produces pseudo recorded image data that includes the pseudo pixels on the entire first surface of the recording medium P.

For example, when the grip roller 213 of the embodiment is used, the micro computer 601 produces pseudo recorded image data by which the pseudo pixels are recorded at about 8 to 22 points/mm2 or a denser pitch on the entire other face of the recording medium P. When the recording instruction information received from the external apparatus by the micro computer 601 includes an instruction necessary for the execution of the recording operation for both surfaces of the recording medium P (the first surface and the second surface of the recording medium P), the micro computer 601 produces the pseudo recorded image data for the second surface of the recording medium P.

When the recording instruction information received from the external apparatus by the micro computer 601 includes an instruction for production of the pseudo recorded image data for the recording operation for the other side of the recording medium P, the micro computer 601 may produce the pseudo recorded image data and may execute the recording operation according to the pseudo recorded image data for the second surface of the recording medium P. Thereby, the user of the printer 100 can arbitrarily set the image quality.

When the micro computer 601 receives the recording instruction information regardless of whether the recording instruction information received thereby from the external apparatus includes an instruction necessary for the execution of the recording operation for both surfaces of the recording medium P, the micro computer 601 may produce the pseudo recorded image data for the second surface of the recording medium P and may execute the recording operation according to the pseudo recorded image data for the second surface of the recording medium P. Thereby, for example, when the recording media P for each of which the recording operation is executed for both surfaces using the conventional techniques are formed as a book, the difference can be caused to tend to be inconspicuous between the recording surface that abuts the grip roller 213 (the first surface of the recording medium P) and the recording surface that does not abut the grip roller 213 (the second surface of the recording medium P), in double-spread pages, etc.

A processing procedure of the printer 100 of the embodiment will be described. FIG. 10 is a flowchart of the processing procedure of the printer 100 of the embodiment.

As depicted in the flowchart in FIG. 10, the printer 100 waits until recording instruction information output from the external apparatus has been received (step S1001: NO). When the printer 100 has received a recording instruction information output from the external apparatus at step S1001 (step S1001: YES), the printer 100 produces the pseudo recorded image data based on the received recording instruction information (step S1002).

At step S1002, for example, the printer 100 produces the pseudo recorded image data for the recording operation for the second surface of the recording medium P and the pseudo recorded image data for the recording operation for the first surface of the recording medium P. The pseudo recorded image data for the recording operation for the first surface of the recording medium P may be the pseudo recorded image data that includes the pseudo pixels of the pattern depicted in FIG. 7 or may be the pseudo recorded image data that includes the pseudo pixels of the pattern depicted in FIG. 8B. The pattern of the pseudo pixels may be determined based on the information included in the recording instruction information received at step S101: YES or may be set in advance in the printer 100.

At step S1002, for example, the printer 100 may produce the pseudo recorded image data for the recording operation for the second surface of the recording medium P, based on the information included in the recording instruction information received at step S1001: YES. Although not especially specified, whether the printer 100 is to produce the pseudo recorded image data for the recording operation for the second surface of the recording medium P may be preliminarily set in the printer 100.

At step S1002, if the recording instruction information received at step S1001: YES is information instructing the execution of the recording operation for only the second surface of the recording medium P, the printer 100 produces the pseudo recorded image data for the recording operation for the second surface of the recording medium P. In this case, though not especially specified, whether the printer 100 is to produce the pseudo recorded image data for the recording operation for the second surface of the recording medium P may be preliminarily set in the printer 100.

The printer 100 drives and controls the driver IC 603 and the motor driver 604 according to the pseudo recorded image data produced at step S1002 (step S1003), thereby, executes the recording operation for the recording medium P, and causes the series of process steps to come to an end.

In the embodiment, the printer 100 has been described as the printer according to the present invention and to include the recording unit 204 alone, which includes the thermal head 205 and the platen 206. However, the printer is not limited hereto. The printer according to the present invention may include plural recording units.

For example, the printer according to the present invention may be implemented by a printer that includes a first recording unit (a first recording unit) disposed at a position to face a surface of the recording medium P (the surface on which the recording operation is firstly executed, the front surface, the second surface of the recording medium P) and a second recording unit (a second recording unit) disposed at a position to face the back surface of the recording medium P (the surface on which the recording operation is executed subsequently, the back surface, the first surface of the recording medium P).

In this case, the first and the second recording units each include a printing head and a platen disposed facing the printing head. The printer including the first and the second recording units executes a recording operation for the second surface of the recording medium P using the first recording unit and executes another recording operation for the first surface of the recording medium P using the second recording unit.

Thus, such a printer produces pseudo recorded image data for the recording operation for the recording medium P on which the first recording unit executes the recording operation on the second surface thereof, that is, the recording operation executed by the second recording unit; and drives the second recording unit based on the pseudo recorded image data. The printer may produce the pseudo recorded image data for the recording operation executed by the first recording unit; and may drive the first recording unit based on the pseudo recorded image data.

Although the embodiment has been described assuming a case where the protrusions on the grip roller 213 evenly abut the recording medium P, the configuration is not limited hereto. The distribution of abutting force (the pressing force) of the pinch roller 214 abutting the grip roller 213 may be adjusted for each position along the central axis direction of the grip roller 213.

In this case, the abutting force (the pressing force) of the pinch roller 214 abutting the grip roller 213 is set such that the size (the diameter) of each protrusion mark becomes smaller as the position thereof becomes closer to the second area (a non-grip area) 702 (see FIG. 8A). The size of each protrusion on the grip roller may be set to become smaller as the position thereof becomes closer to the second area, maintaining the distribution of the abutting force to be uniform, or the distribution of the abutting force and the distribution of the size of the protrusion may both be varied.

For example, the abutting force against the grip roller 213 of the pinch roller 214 abutting the grip roller 213 is enhanced in the portion of the grip roller 213 having the protrusions disposed therein. The abutting force (the pressing force) is set to be weaker at a position closer to the border 703 in the portion having the protrusions disposed therein on the grip roller 213.

In this case, the density of each of the pseudo pixels is adjusted corresponding to the abutting force (pressing force) against the grip roller 213 of the pinch roller 214 abutting the grip roller 213. The border 703 can be caused to tend to be inconspicuous by adjusting, as described above, the density (transparency) of each pseudo pixel corresponding to the abutting force (pressing force) against the grip roller 213, of the pinch roller 214 abutting the grip roller 213. Degradation of the image quality due to the conspicuousness of the border portion between the pseudo pixels and the protrusion marks can be suppressed by distributing the density correction amounts according to the size of the protrusion marks in the pseudo image by superimposing the area having the pseudo pixels recorded therein, on the area having the protrusion marks generated therein.

The printer 100 of the embodiment has been described taking an example where the micro computer 601 included in the printer 100 produces the pseudo recorded image data. However, the pseudo recorded image data is not limited to that produced by the micro computer 601 included in the printer 100. An external apparatus other than the printer 100 may produce the pseudo recorded image data by causing the printer driver, etc., to have the function of producing the pseudo recorded image data instead of the micro computer 601 included in the printer 100.

As described, the printer 100 of the embodiment includes the recording unit 204, which executes the recording operation in the sublimation transfer scheme for the recording medium P, and the grip roller 213, which has protrusions protruding toward the outer periphery, abutting the first surface of the recording medium P, and conveying the recording medium P on which the recording unit 204 executes the recording operation, to the recording position for the recording operation by the recording unit 204; and is characterized in that the printer 100 produces the pseudo recorded image data that includes the pseudo pixels obtained by correcting the density of each of the predetermined pixels determined corresponding to the arrangement pattern of the protrusions on the grip roller 213, of the pixels recorded in the second area 702 that excludes the first area 701 in contact with the protrusions on the recording medium P conveyed by the grip roller 213, and controls the recording unit 204 based on the produced pseudo recorded image data.

According to the printer 100 of the embodiment, when the recording operation is executed for the first surface of the recording medium P having the protrusion marks generated in the first area 701 due to the contact with the protrusions on the grip roller 213 during the recording operation for the second surface of the recording medium P, an image can be recorded that includes the pseudo pixels obtained by correcting the density of each of the predetermined pixels, among the pixels recorded in the second area 702 having no protrusion mark therein.

Thereby, an image can be recorded in the second area 702, that includes the pseudo pixels obtained by correction by copying the protrusion marks generated in the first area 701 in the pattern according to the pattern of the protrusions on the grip roller 213. Thereby, the state in the second area 702 can be reproduced, which is the same as the state where the portions remaining in white (the protrusion marks) are generated in the first area 701, and the protrusion marks generated in the first area 701 and the border 703 between the first and the second areas 701 and 702 can be caused to be more inconspicuous. Thereby, according to the printer 100 of the embodiment, consistent recording quality can be secured on the same recording surface.

The printer 100 of the embodiment is characterized in that the density of each of the predetermined pixels is corrected by reducing the density of each of the predetermined pixels to be lower than the densities of the pixels surrounding the predetermined pixels.

According to the printer 100 of the embodiment, an image can be recorded that includes the pseudo pixels obtained by reducing the density of each of the pseudo pixels to be lower than the densities of the pixels surrounding the predetermined pixels. Thereby, according to the printer 100 of the embodiment, the image can be recorded in the second area 702 that includes the color-density-reduced pseudo pixels that match the protrusion marks generated in the first area 701 in the pattern according to the pattern of the protrusions on the grip roller 213.

Thereby, according to the printer 100 of the embodiment, the protrusion marks generated in the first area 701 and the border 703 between the first and the second areas 701 and 702 can easily and securely be caused to tend to be inconspicuous, and consistent recording quality can be secured on the same recording surface.

The printer 100 of the embodiment is characterized in that the printer 100 produces the pseudo recorded image data by reducing, at the predetermined ratio, the density of each of the predetermined pixels to be lower than the densities of the predetermined pixels in the original image data.

According to the printer 100, the density of each of the predetermined pixels can be reduced to be lower than the densities of the pixels surrounding the predetermined pixels by adjusting the information on the density, among information concerning the hue, the chroma, and the density (luminance) that characterize each pixel. Thus, according to the printer 100 of the embodiment, the protrusion marks generated in the first area 701 and the border 703 between the first and the second areas 701 and 702 can be caused to tend to be inconspicuous, suppressing any increase of the processing load on the printer 100 to produce the pseudo recorded image data that includes the pseudo pixels.

The printer 100 of the embodiment may produce pseudo recorded image data that includes the pseudo pixels having a larger density correction amount at a position closer to the border 703 with the second area 702 than at a position far from the border, in the first area 701. For example, the printer 100 may use the grip roller 213 having the protrusions disposed thereon such that the size of each protrusion mark generated on the first surface of the recording medium P due to the abutting the grip roller 213 becomes smaller at a position closer to the border 703 (or the pressure of the pinch roller 214 is adjusted accordingly); may produce pseudo recorded image data that includes pseudo pixels that are at a position farther from the border 703 with the second area 702 and for which at least any one among the density correction amount and the diameter is more reduced to be lower than that of a pixel at a position closer to the border 703, among the pixels to be recorded in the first area 701; and may produce the pseudo recorded image data using the density correction amount equal to that of each pseudo pixel in the border portion in the first area, in the second area. In this case, the border 703 between the first and the second areas 701 and 702 can be caused to tend to be inconspicuous, and an image can be recorded that is as high resolution as possible in the second area. Thereby, a higher-quality recorded material can be obtained.

The printer 100 of the embodiment is characterized in that the printer 100 includes a mechanism as the reversing unit that with respect to the recording position, turns over the recording medium P on which the recording operation has been executed on the second surface thereof by the recording unit 204; the grip roller 213 subsequently conveys the recording medium P to the recording position; the printer 100 produces the pseudo recorded image data for the recording operation for the recording medium P that is conveyed by the grip roller 213 and on which the recording operation has been executed on the second surface thereof; and the printer 100 executes the recording operation on the first surface of the recording medium P based on the produced pseudo recorded image data.

According to the printer 100 of the embodiment, the one recording unit 204 can execute the recording operation for both surfaces of the recording medium P. Thereby, size reductions can be facilitated for the printer 100 that can secure consistent recording quality on the same recording surface.

The printer 100 of the embodiment is characterized in that the printer 100 produces pseudo recorded image data that includes the pseudo pixels obtained by correcting the density of each of the predetermined pixels determined corresponding to the arrangement pattern of the protrusions on the grip roller 213, among the pixels recorded on the second surface of the recording medium P, and executes the recording operation on the second surface of the recording medium P based on the produced pseudo recorded image data.

According to the printer 100 of the embodiment, the image including the pseudo pixels obtained by copying the protrusion marks generated in the first area on the first surface of the recording medium P can be recorded over the entire second surface (the front surface) of the recording medium P in addition to the second area 702 on the first surface. Thereby, according to the printer 100 of the embodiment, any inconsistency in the quality of the recorded image (image quality) between the second surface (the front surface) and the first surface (the back surface) of the recording medium P can be suppressed, and any differences are not perceived when the image recorded on the second surface (the front surface) and the image recorded on the first surface (the back surface) are compared placed side by side.

For example, the recording surface (the first surface) having no protrusion mark generated therein and the first surface (the back surface) having the protrusion marks generated therein may be visually recognized when placed side by side in a book formed by coupling the sides of the recording media P each having images recorded on both surfaces thereof like a book referred to as "photo book". However, even in this state, by recording the pseudo pixels on the entire other face (the front surface) having no protrusion mark generated thereon, differences in the recording quality caused by differences of the recording medium P can be made to be inconspicuous and consistent recording quality can be secured for the recording operation for both surfaces even when the second surface (the front surface) having no protrusion mark generated therein and the first surface (the back surface) having the protrusion marks generated therein are placed side by side like double-spread pages in a book.

The printer according to the embodiment may be applied to a printer that includes the first recording unit that executes the recording operation on the second surface (the front surface) of the recording medium P and the second recording unit that executes the recording operation on the first surface (the back surface) that is the back surface of the recording surface with respect to the first recording unit, and this printer may produce the pseudo recorded image data for the recording operation by the second recording unit after the execution of the recording operation on the first surface by the first recording unit, and may execute the recording operation for the first surface (the back surface) of the recording medium P based on the pseudo recorded image data.

According to such a printer, a printer including no mechanism to turn over the recording medium P can also record in the second area 702, an image that includes the pseudo pixels obtained by correcting by copying the protrusion marks generated in the first area 701, in a pattern according to the pattern of the protrusions on the grip roller 213.

Thereby, the same state as the state where the portions remaining in white (the protrusion marks) are generated in the first area 701 can be reproduced in the second area 702, and the protrusion marks generated in the first area 701 and the border 703 between the first and the second areas 701 and 702 can be made to be inconspicuous. Thereby, according to the printer 100 of the embodiment, consistent recording quality can be secured on the same recording surface.

According to the printer 100 of the embodiment, consistent recording quality can be secured on the same recording surface by merely changing the programs such as the printer driver in an existing printer that includes the mechanism executing the recording operation on both surfaces of the recording medium P according to the sublimation transfer scheme. Thereby, the printer 100 can easily be implemented without adding or changing any hardware configuration.

As described, the printer according to the embodiment is useful for a printer capable of recording on both surfaces of a recording medium and is particularly suitable for a printer capable of recording on both surfaces of the recording medium by executing a recording operation under a sublimation transfer scheme.

According to the printer of the present invention, an effect is achieved that a consistent recording quality can be secured on the same recording surface.

According to the printer according to the present invention, another effect is achieved that consistent recording quality can be secured in the same recording surface without making the structure of the printer complicated and without increasing the size thereof.

What is claimed is:

1. A printer comprising:
   a recording unit that executes on a recording medium, a recording operation under a sublimation transfer scheme;
   a conveying unit that, using a protrusion roller having thereon protrusions protruding toward an outer periphery and abutting a first surface of the recording medium, conveys the recording medium on which the recording unit executes the recording operation, to a recording position for the recording operation executed by the recording unit;
   a pseudo recorded image data producing unit that produces pseudo recorded image data that includes pseudo pixels obtained by correcting a density of each predetermined pixel that is determined corresponding to an arrangement pattern of the protrusions on the protrusion roller and is determined from among pixels to be recorded in a second area that excludes a first area that is in contact with the protrusions, on the first surface of the recording medium conveyed by the conveying unit; and
   a recording control unit that controls the recording unit based on the pseudo recorded image data.

2. The printer according to claim 1, wherein
   the pseudo recorded image data producing unit corrects the density of each predetermined pixel by reducing the density of the predetermined pixel to be lower than a density of a pixel near the predetermined pixel.

3. The printer according to claim 2, wherein
the pseudo recorded image data producing unit produces the pseudo recorded image data by reducing the density of the predetermined pixel, at a predetermined ratio, to be lower than the density of the predetermined pixel in original image data.

4. The printer according to claim 1, wherein
the protrusion roller includes the protrusions disposed thereon such that the size of protrusion marks generated on the first surface of the recording medium consequent to abutting of the first surface against the protrusion roller progressively decreases at positions closer to a border with the second area, and
the pseudo recorded image data producing unit produces the pseudo recorded image data that includes a pseudo pixel obtained by reducing at least any one among a density correction amount and a diameter of a first predetermined pixel at a position farther from the border, to be smaller than that of a second predetermined pixel at a position closer to the border, the first and the second predetermined pixels being determined corresponding to the arrangement pattern of the protrusions and from among pixels to be recorded in the first area, the pseudo recorded image data further including among the pixels to be recorded in the second area, a pseudo pixel having the density correction amount and the diameter of a pixel that is in a border portion and among predetermined pixels that are in the first area and determined corresponding to the arrangement pattern of the protrusions.

5. The printer according to claim 1, further comprising
a reversing unit that, with respect to the recording position, turns the recording medium over to the first surface thereof after the recording unit executes the recording operation on a second surface of the recording medium, wherein
the conveying unit conveys to the recording position, the recording medium that has been turned over by the reversing unit, and
the pseudo recorded image data producing unit produces the pseudo recorded image data for the recording operation to be executed on the first surface after the recording medium has been turned over by the reversing unit.

6. The printer according to claim 1, wherein
the recording unit comprises a first recording unit that executes a recording operation on a second surface of the recording medium, and a second recording unit that executes a recording operation on the first surface, and
the pseudo recorded image data producing unit produces the pseudo recorded image data for the recording operation that is executed by the second recording unit after the first recording unit executes the recording operation.

7. The printer according to claim 5, wherein
the pseudo recorded image data producing unit produces the pseudo recorded image data that includes pseudo pixels obtained by correcting a density of each predetermined pixel that is determined corresponding to an arrangement pattern of the protrusions and among pixels to be recorded on the second surface.

8. The printer according to claim 3, wherein
the protrusion roller includes the protrusions disposed thereon such that the size of protrusion marks generated on the first surface of the recording medium consequent to abutting of the first surface against the protrusion roller progressively decreases at positions closer to a border with the second area, and
the pseudo recorded image data producing unit produces the pseudo recorded image data that includes a pseudo pixel obtained by reducing at least any one among a density correction amount and a diameter of a first predetermined pixel at a position farther from the border, to be smaller than that of a second predetermined pixel at a position closer to the border, the first and the second predetermined pixels being determined corresponding to the arrangement pattern of the protrusions and from among pixels to be recorded in the first area, the pseudo recorded image data further including among the pixels to be recorded in the second area, a pseudo pixel having the density correction amount and the diameter of a pixel that is in a border portion and among predetermined pixels that are in the first area and determined corresponding to the arrangement pattern of the protrusions.

9. The printer according to claim 8, further comprising
a reversing unit that, with respect to the recording position, turns the recording medium over to the first surface thereof after the recording unit executes the recording operation on a second surface of the recording medium, wherein
the conveying unit conveys to the recording position, the recording medium that has been turned over by the reversing unit, and
the pseudo recorded image data producing unit produces the pseudo recorded image data for the recording operation to be executed on the first surface after the recording medium has been turned over by the reversing unit.

10. The printer according to claim 8, wherein
the recording unit comprises a first recording unit that executes a recording operation on a second surface of the recording medium, and a second recording unit that executes a recording operation on the first surface, and
the pseudo recorded image data producing unit produces the pseudo recorded image data for the recording operation that is executed by the second recording unit after the first recording unit executes the recording operation.

11. The printer according to claim 6, wherein
the pseudo recorded image data producing unit produces the pseudo recorded image data that includes pseudo pixels obtained by correcting a density of each predetermined pixel that is determined corresponding to an arrangement pattern of the protrusions and among pixels to be recorded on the second surface.

* * * * *